United States Patent
Yada

(10) Patent No.: US 9,058,182 B2
(45) Date of Patent: Jun. 16, 2015

(54) MANAGEMENT DEVICE FOR CAUSING DEVICES TO UPDATE PROGRAMS AND COMPUTER READABLE MEDIA

(71) Applicant: Yuki Yada, Kuwana (JP)

(72) Inventor: Yuki Yada, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 85 days.

(21) Appl. No.: 13/626,637

(22) Filed: Sep. 25, 2012

(65) Prior Publication Data

US 2013/0086574 A1    Apr. 4, 2013

(30) Foreign Application Priority Data

Sep. 30, 2011    (JP) .................................. 2011-216368

(51) Int. Cl.
*G06F 9/44* (2006.01)
*G06F 9/445* (2006.01)

(52) U.S. Cl.
CPC ... *G06F 9/44* (2013.01); *G06F 8/65* (2013.01)

(58) Field of Classification Search
CPC .......................................................... G06F 8/65
USPC .......................................... 717/169, 172, 173
See application file for complete search history.

(56) References Cited

U.S. PATENT DOCUMENTS

| | | | |
|---|---|---|---|
| 6,131,121 A | 10/2000 | Mattaway et al. | |
| 6,339,789 B1 | 1/2002 | Sugauchi et al. | |
| 6,510,153 B1 | 1/2003 | Inoue et al. | |
| 6,513,066 B1 | 1/2003 | Hutton et al. | |
| 7,318,099 B2 | 1/2008 | Stahl et al. | |
| 7,609,690 B2 | 10/2009 | Ogata | |
| 7,707,573 B1 | 4/2010 | Marmaros et al. | |
| 7,934,210 B1* | 4/2011 | Stampfli et al. | 717/168 |
| 7,953,901 B2* | 5/2011 | Nishikawa | 710/8 |
| 8,032,881 B2* | 10/2011 | Holmberg et al. | 717/171 |
| 8,250,564 B2* | 8/2012 | Bando et al. | 717/171 |
| 8,266,613 B2* | 9/2012 | Bando et al. | 717/173 |
| 8,285,756 B2* | 10/2012 | Nimura et al. | 707/805 |

(Continued)

FOREIGN PATENT DOCUMENTS

| | | |
|---|---|---|
| JP | 5-250170 A | 9/1993 |
| JP | H06110811 A | 4/1994 |

(Continued)

OTHER PUBLICATIONS

Aug. 20, 2014—(US) Non-Final Office Action—U.S. Appl. No. 13/626,621.

(Continued)

*Primary Examiner* — Phillip H Nguyen
(74) *Attorney, Agent, or Firm* — Banner & Witcoff, Ltd.

(57) ABSTRACT

A management device may be connected with first and second devices via a network. The management device may acquire "m" programs that are to be updated in the first device and "n" programs that are to be updated in the second device, from a server. Each of "m" and "n" may be an integer greater than or equal to 2, the "m" programs may include first and second programs, and the "n" programs may include a third and a fourth programs. The management device may transmit the first program to the first device and transmit the third program to the second device. The management device may, after completion of the transmitting the first program and the third program, transmit the second program to the first device and transmit the fourth program to the second device.

11 Claims, 12 Drawing Sheets

(56) References Cited

U.S. PATENT DOCUMENTS

| | | |
|---|---|---|
| 8,433,789 B2 | 4/2013 | Nagatani |
| 8,650,560 B2 | 2/2014 | Seki et al. |
| 2001/0049732 A1 | 12/2001 | Raciborski et al. |
| 2003/0081595 A1 | 5/2003 | Nomura et al. |
| 2003/0088650 A1 | 5/2003 | Fassold et al. |
| 2005/0141025 A1 | 6/2005 | Hanada |
| 2006/0235949 A1* | 10/2006 | Tai et al. ............... 709/219 |
| 2007/0250830 A1* | 10/2007 | Holmberg et al. ....... 717/171 |
| 2007/0288423 A1* | 12/2007 | Kimoto ............... 707/1 |
| 2008/0071942 A1* | 3/2008 | Takamoto et al. ....... 710/19 |
| 2008/0148268 A1* | 6/2008 | Hirouchi ............... 718/103 |
| 2009/0177806 A1* | 7/2009 | Nishikawa ............... 710/10 |
| 2010/0169878 A1 | 7/2010 | Seki et al. |
| 2010/0250738 A1 | 9/2010 | Nagatani |
| 2012/0084767 A1 | 4/2012 | Ishimoto |
| 2013/0086281 A1 | 4/2013 | Yada |

FOREIGN PATENT DOCUMENTS

| | | |
|---|---|---|
| JP | 2005-190308 A | 7/2005 |
| JP | 2009-193218 A | 8/2009 |
| JP | 2010-092322 A | 4/2010 |
| JP | 2010-152670 A | 7/2010 |
| JP | 2010-239462 A | 10/2010 |
| JP | 2011-172097 A | 9/2011 |
| JP | 2012-078916 A | 4/2012 |

OTHER PUBLICATIONS

Nov. 25, 2014—(JP) Notification of Reasons for Rejection—App 2011-216367—Eng Tran.
Nov. 25, 2014—(JP) Notification of Reasons for Rejection—App 2011-216368—Eng Tran.
Jan. 27, 2015—(US) Final Office Action—U.S. Appl. No. 13/626,621.

* cited by examiner

Fig.4

UPDATE LIST 34

| ORDER | NODE NAME | IP ADDRESS | FIRMWARE NAME | FIRMWARE TYPE | CURRENT VER. | NEW VER. | URL | UPDATE PERIOD | STATUS | IP CONFIRMATION FLAG |
|---|---|---|---|---|---|---|---|---|---|---|
| 1 | P50 | A1 | F1 | MAIN | 1.0 | 1.1 | aaa | 4 (min) | OK | |
| 2 | P60 | A2 | F3 | MAIN | 1.4 | 1.5 | bbb | 2 (min) | OK | |
| 3 | P50 | A1 | F2 | 1st SUB | 2.0 | 2.1 | ccc | 3 (min) | | ON |
| 4 | P60 | A2 | F4 | 1st SUB | 2.2 | 2.3 | ddd | 3 (min) | | ON |
| 5 | P60 | A2 | F5 | 2nd SUB | 3.0 | 3.1 | eee | 1 (min) | | ON |

STANDBY PERIOD "4 MIN" (rows 2–3)
STANDBY PERIOD "3 MIN" (rows 4–5)

102, 104, 106, 108, 110

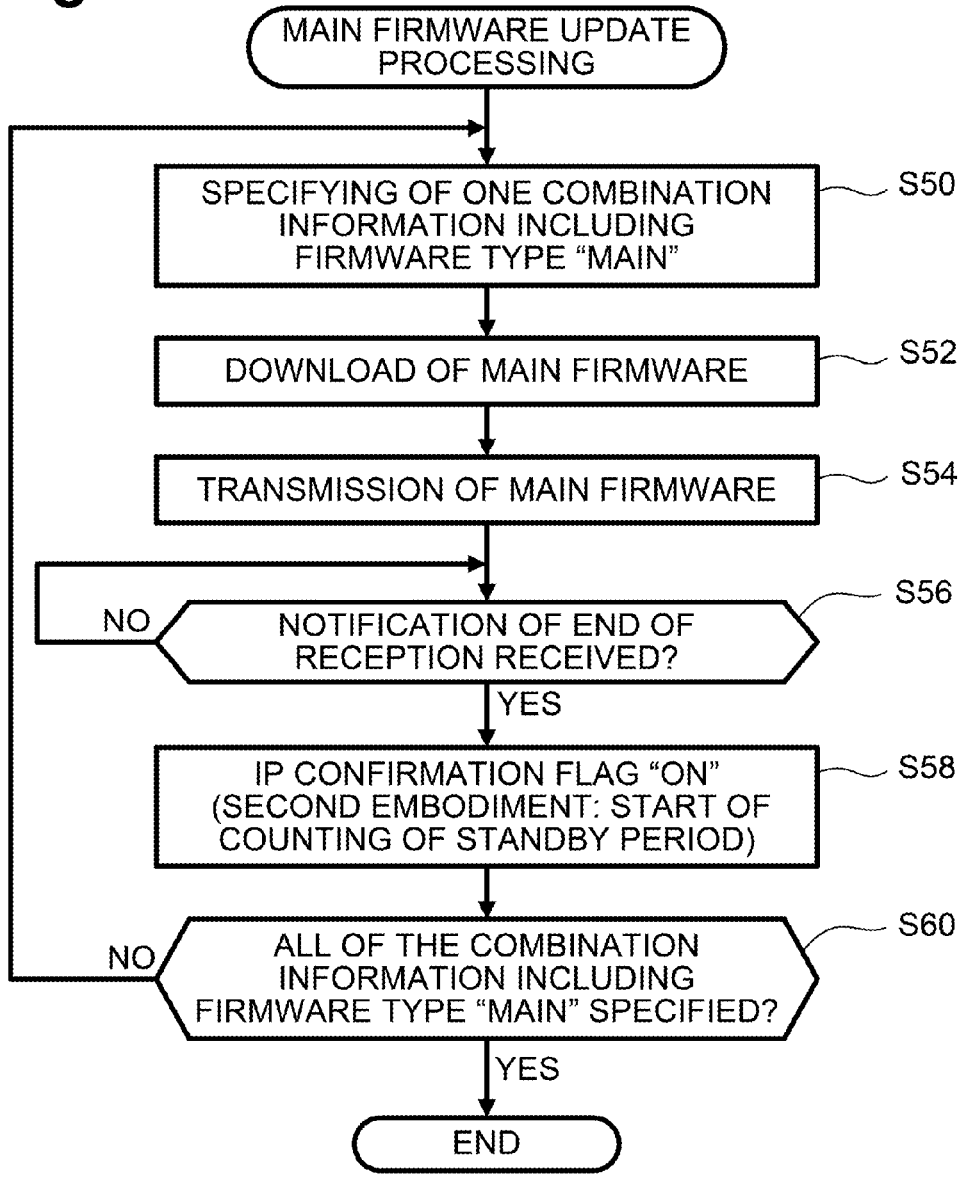

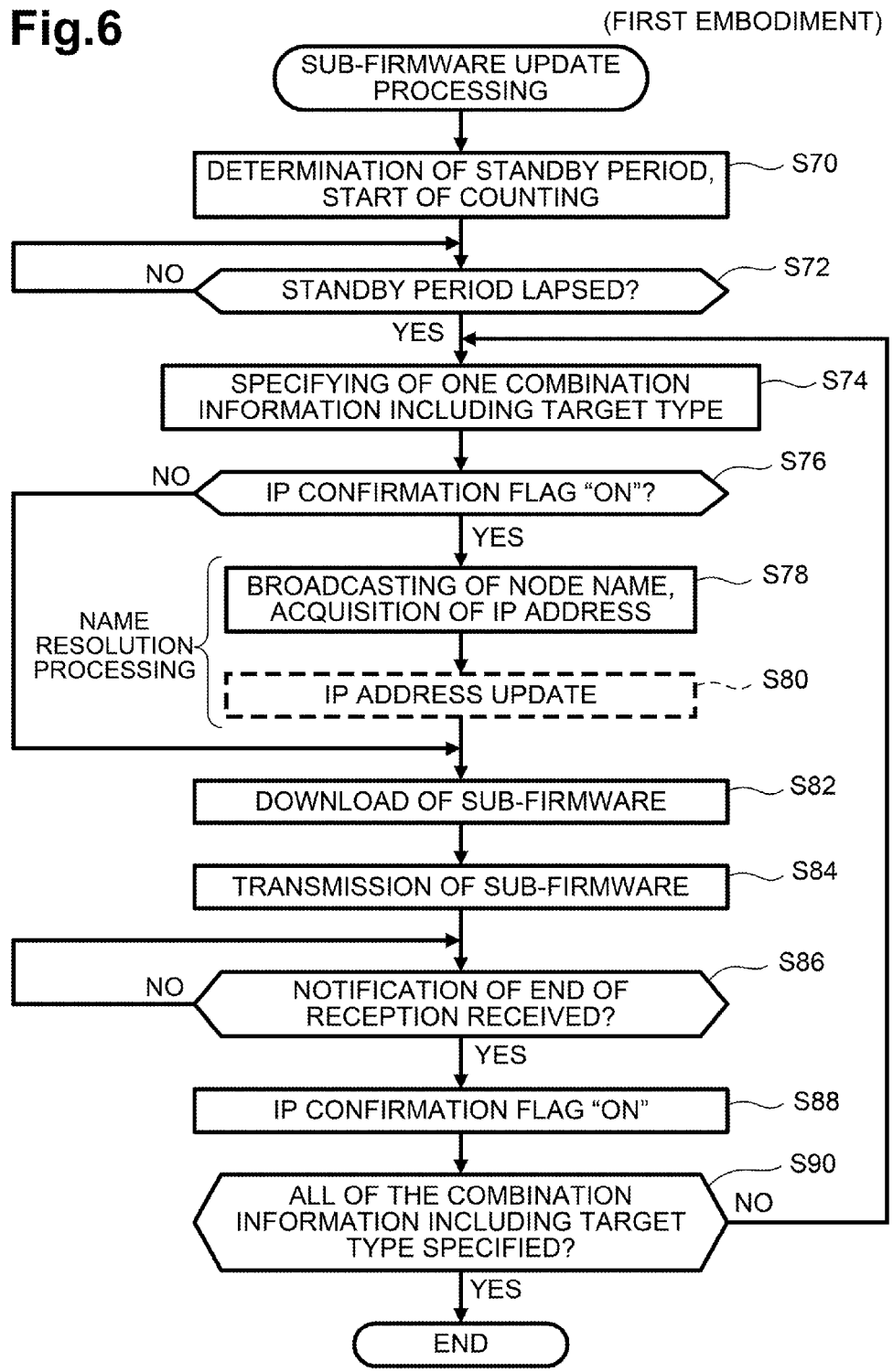

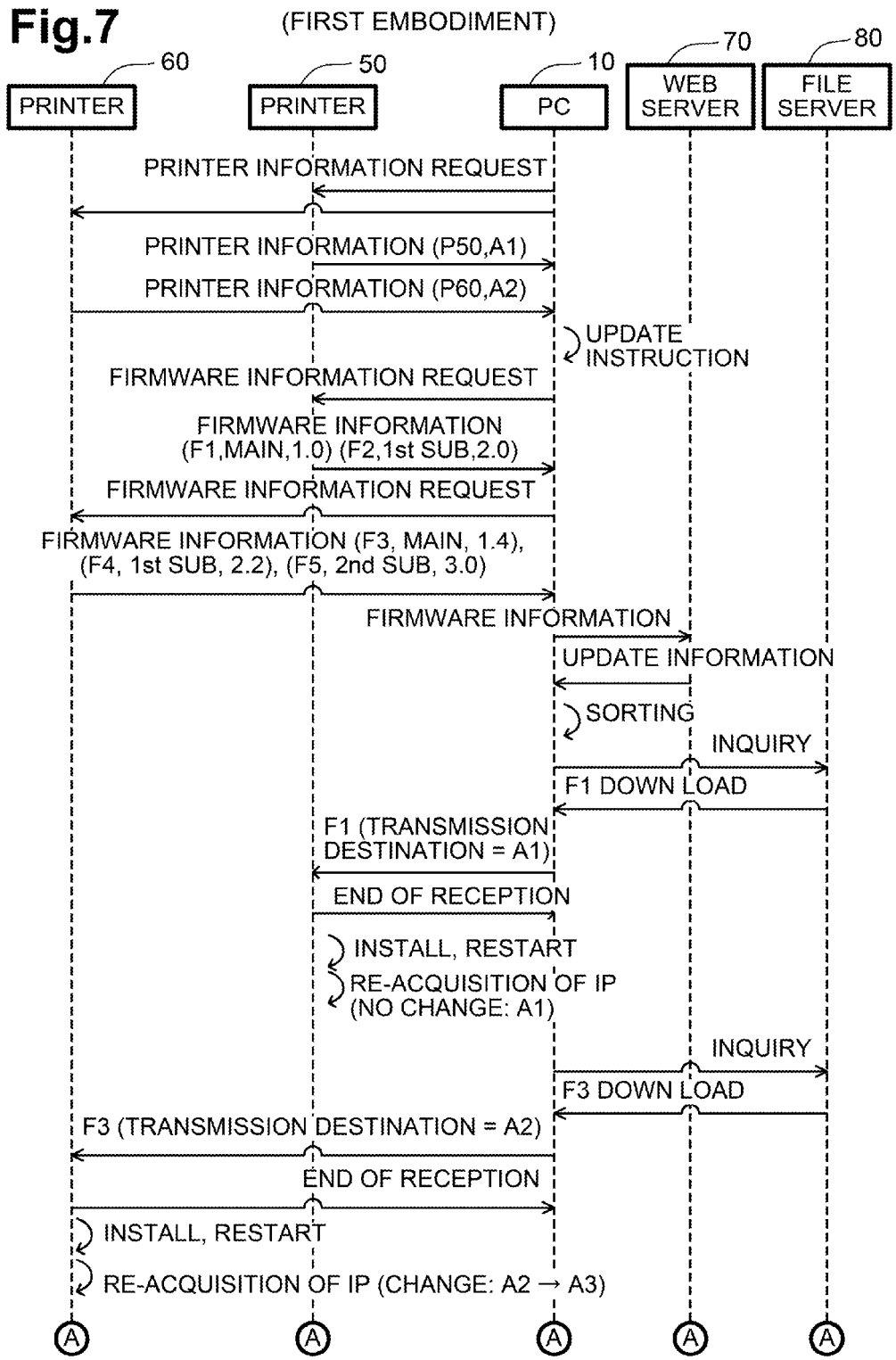

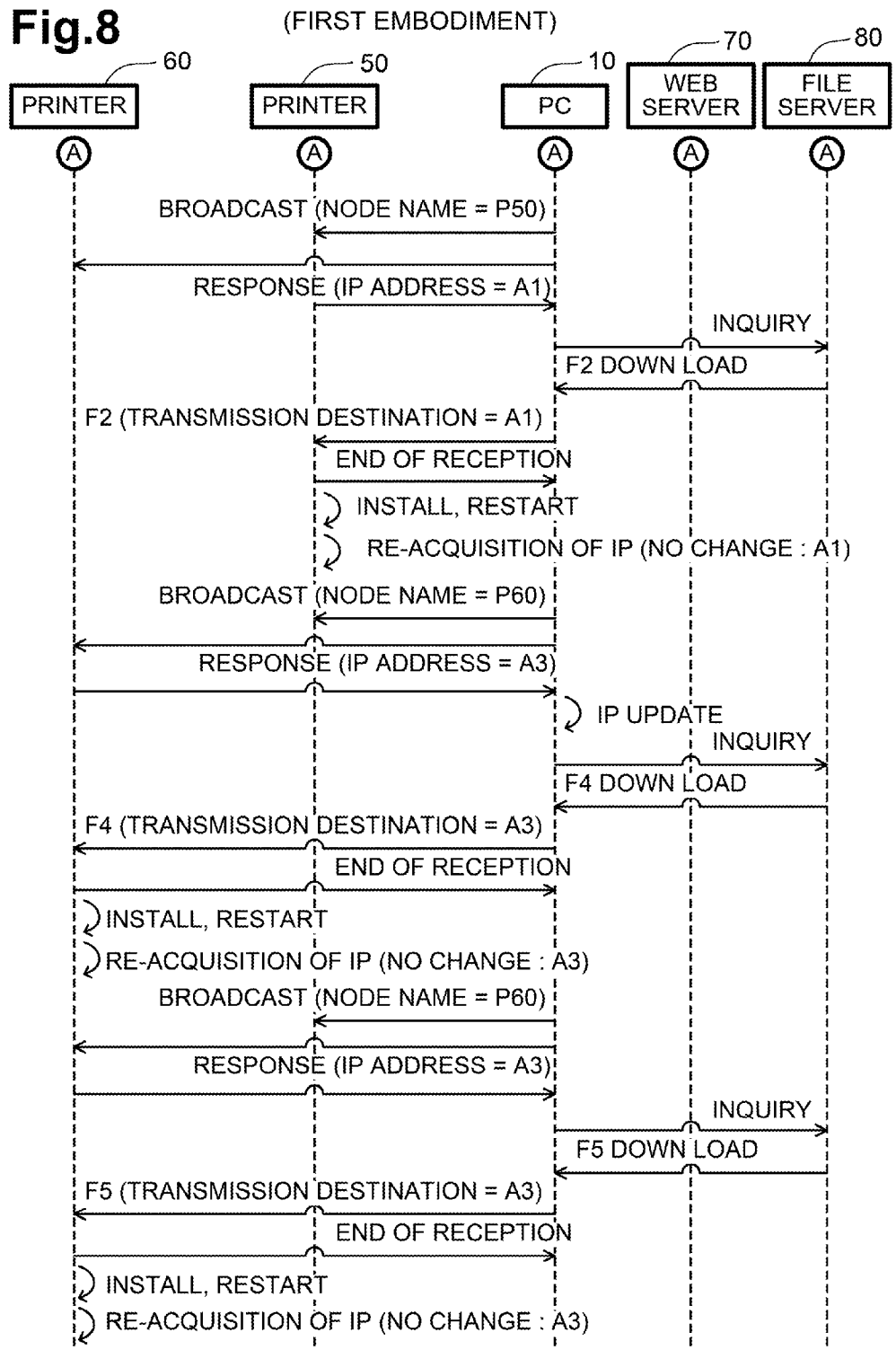

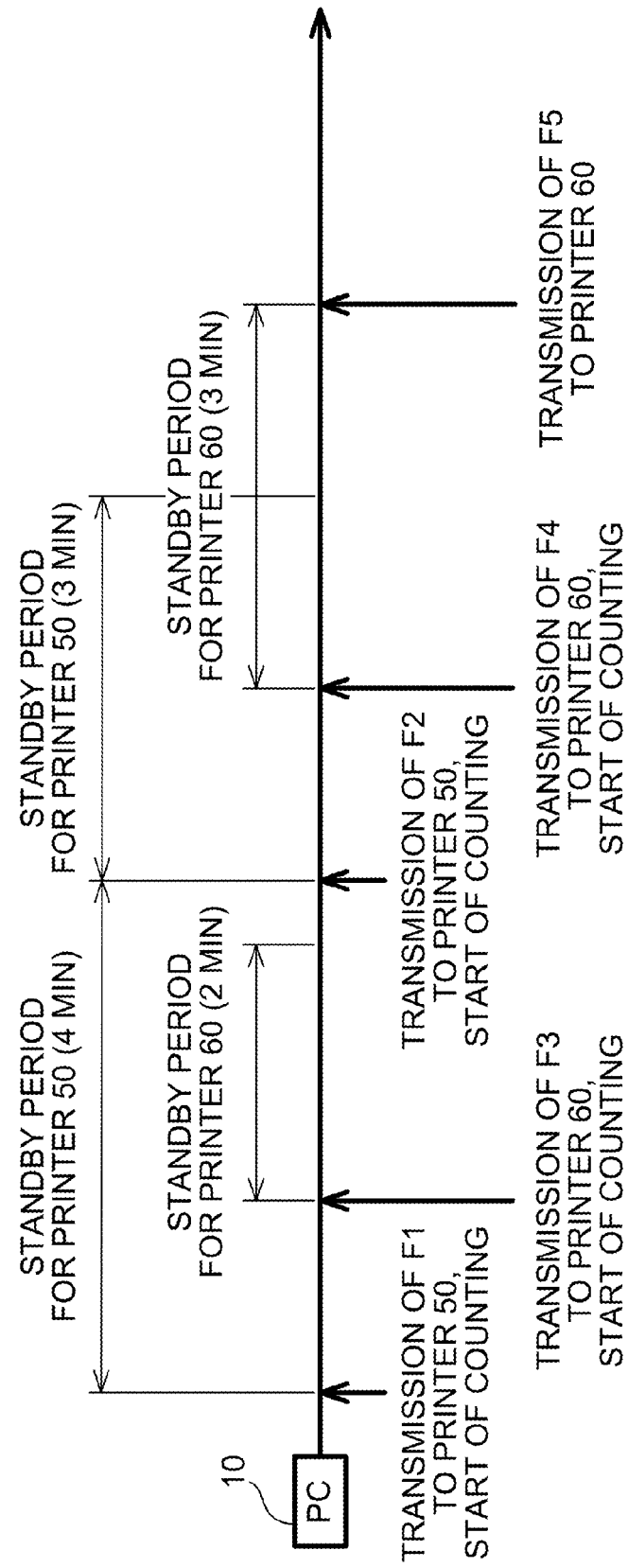

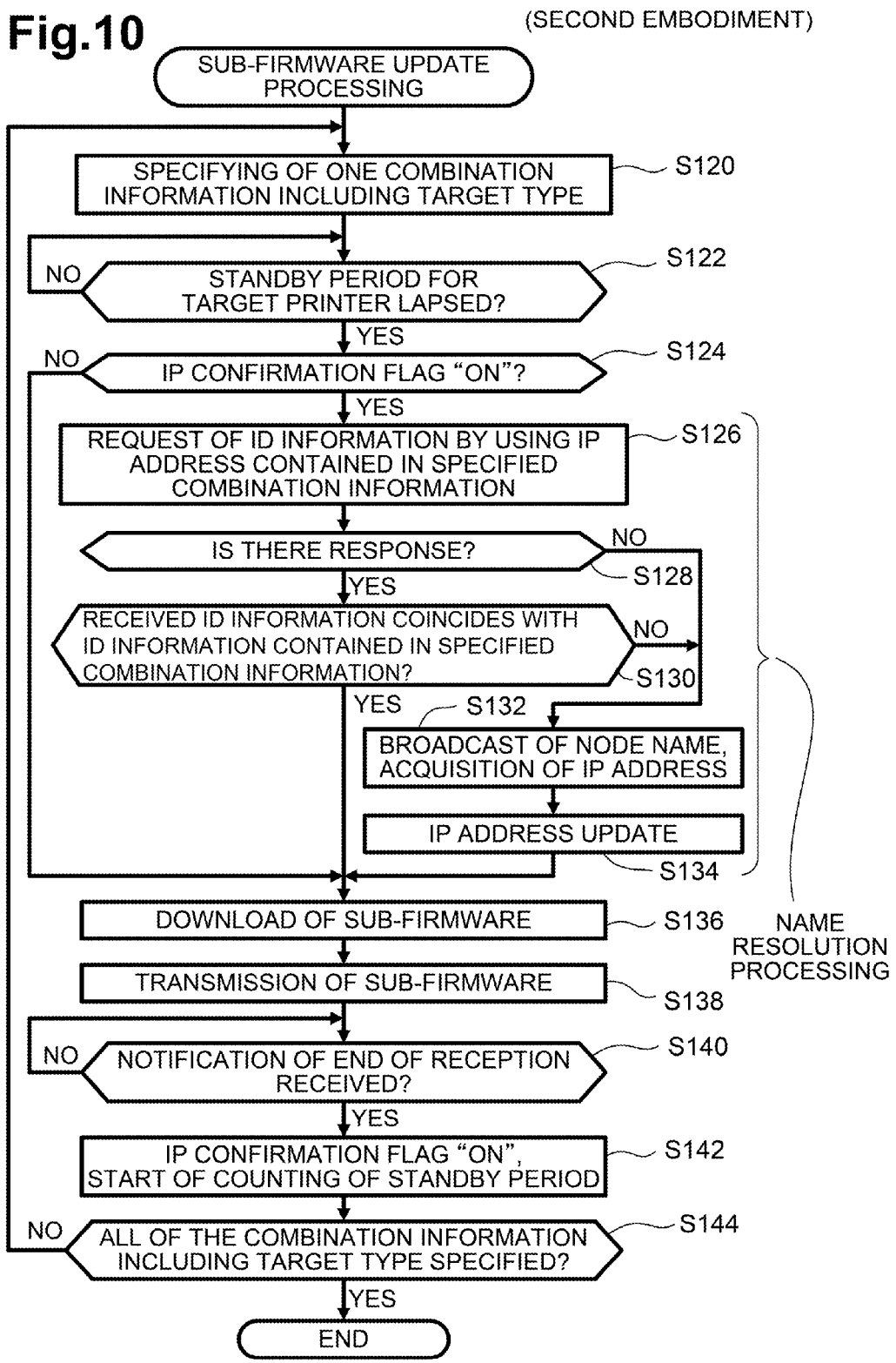

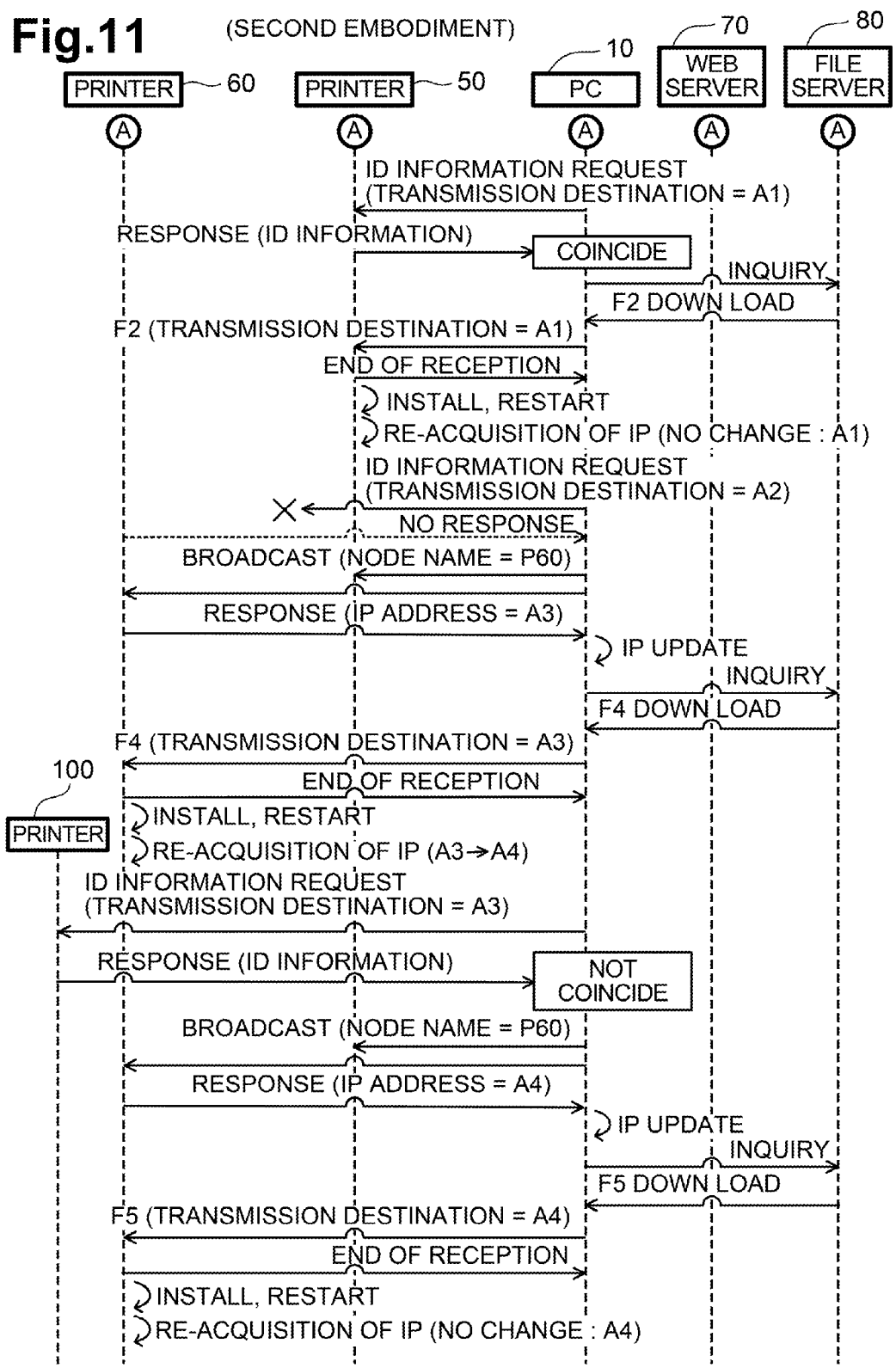

MANAGEMENT DEVICE FOR CAUSING DEVICES TO UPDATE PROGRAMS AND COMPUTER READABLE MEDIA

CROSS-REFERENCE TO RELATED APPLICATION

The present application claims priority from Japanese Patent Application No. 2011-216368, filed on Sep. 30, 2011, which is incorporated herein by reference.

BACKGROUND

1. Technical Field

Aspects of the disclosure relate to a management device that causes each of a plurality of devices to update a plurality of programs.

2. Related Art

US Patent Application Publication No. 2005/0141025A1 discloses a PC for causing an image forming device to update plural pieces of firmware. According to the above document, a PC transmits plural pieces of firmware for update to the image forming device. After storing the plural pieces of firmware for update, the image forming device executes a reboot operation for enabling the plural pieces of firmware for update.

SUMMARY

In the above document, no consideration is made on the update of the plural pieces of firmware in each of a plurality of image forming devices. The present disclosure provides a technique that can appropriately update a plurality of programs in each of a plurality of devices.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the disclosure, and the features and advantages thereof, reference now is made to the following descriptions taken in connection with the accompanying drawings.

FIG. 4 is a diagram illustrating a configuration of the update list.

FIG. 5 is a flow chart illustrating main firmware update processing.

FIG. 6 is a flow chart illustrating sub-firmware update processing.

FIG. 7 is a sequence diagram illustrating operations of various devices.

FIG. 8 is a sequence diagram as a continuation of FIG. 7.

FIGS. 9A and 9B are time charts illustrating standby periods.

FIG. 10 is a flow chart illustrating sub-firmware update processing according to a second illustrative embodiment.

FIG. 11 is a sequence diagram illustrating operations of various devices in the second illustrative embodiment.

DETAILED DESCRIPTION

First Illustrative Embodiment

Figure 1:
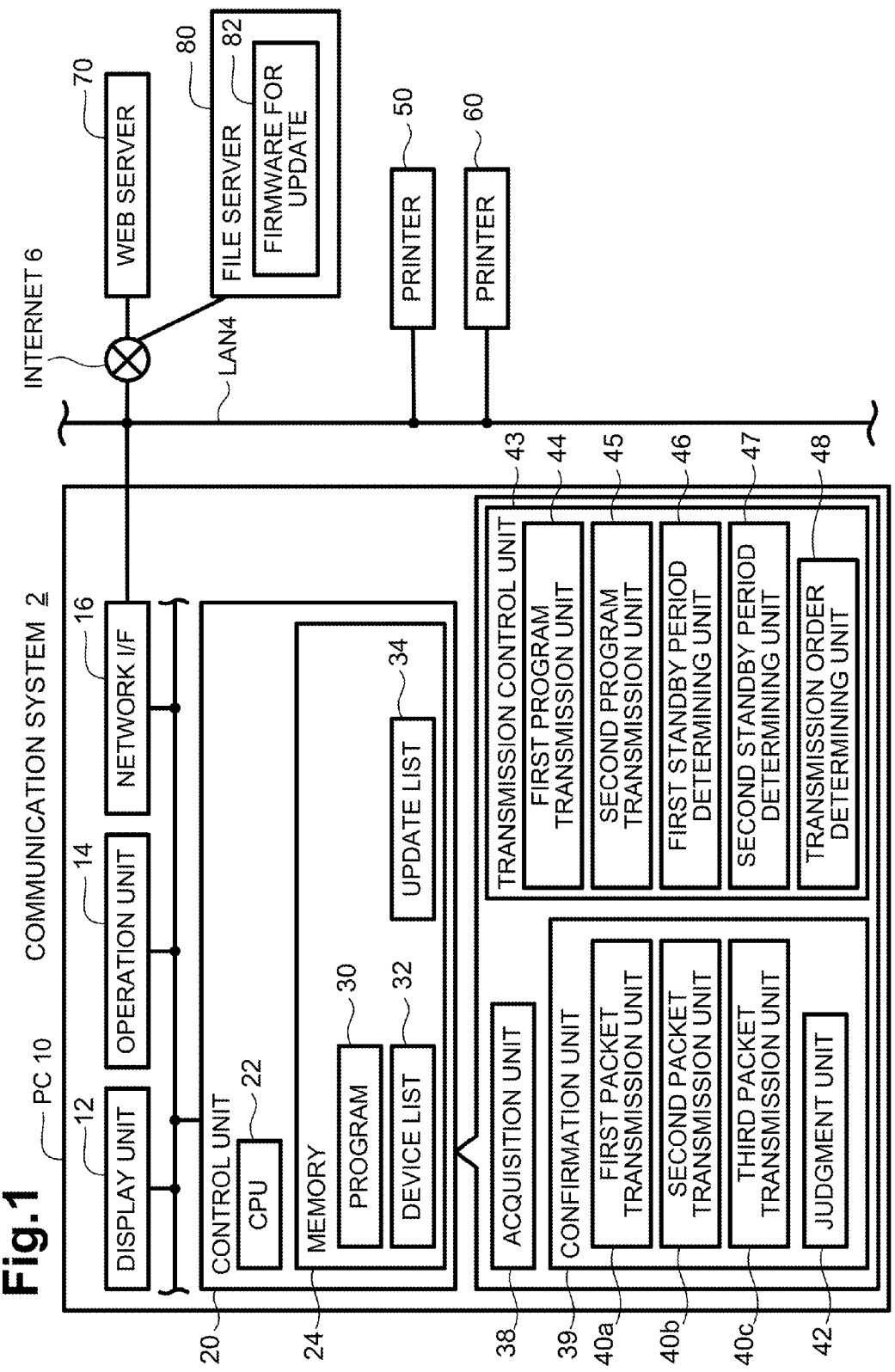
FIG. 1 is a diagram illustrating an example of the configuration of a communication system.

Configuration of System: FIG. 1

As shown in FIG. 1, a communication system 2 comprises: a PC 10, printers 50, 60 (i.e. peripheral devices of the PC 10), a Web server 70, and a file server 80. The PC 10 and the printers 50, 60 are connected to a LAN 4. The PC 10 can communicate with the printers 50, 60 via the LAN 4. Also, the PC 10 is connected to internet 6 via the LAN 4. The Web server 70 and the file server 80 are connected to the internet 6. The PC 10 can communicate with the Web server 70 and the file server 80 via the internet 6.

(Configuration of PC 10)

The PC 10 is a computer arranged in, for example, a company. It manages multiple printers 50, 60 also arranged in the company. The PC 10 comprises: a display unit 12, an operation unit 14, a network interface 16, and a control unit 20. The aforementioned units 12-20 are connected to a bus line (not shown). The display unit 12 is a display for displaying various types of information. The operation unit 14 includes a keyboard and a mouse. The user can manipulate the operation unit 14 so as to input various types of instructions to the PC 10. The network interface 16 is connected to the LAN 4.

The control unit 20 comprises a CPU 22 and a memory 24. The CPU 22 executes various types of processing according to a program 30 stored in the memory 24. The memory 24 may include ROM, RAM, hard disk, etc. The memory 24 can also store, in addition to the program 30, a device list 32 and an update list 34 to be explained later. The program 30 includes a management program for causing each of the multiple printers 50, 60 to update the multiple pieces of firmware. The management program may be installed in the PC 10 from computer readable media included in the package together with the printers 50, 60 when the printers 50, 60 are shipped. Also, the management program may be installed in the PC 10 from the server provided by the vendor of the printers 50, 60.

As the CPU 22 executes processing according to the management program, it is possible to realize the various functions of an acquisition unit 38, a confirmation unit 39 and a transmission control unit 43. The confirmation unit 39 comprises: a first packet transmission unit 40a, a second packet transmission unit 40b, a third packet transmission unit 40c, and a judgment unit 42. The transmission control unit 43 comprises: a first program transmission unit 44, a second program transmission unit 45, a first standby period determining unit 46, a second standby period determining unit 47, and a transmission order determining unit 48.

(Configuration of Printers 50, 60)

The printer 50 comprises CPU, memory, display, and printing executing unit not shown in the drawing. The memory of the printer 50 includes ROM, RAM, hard disk, etc. The ROM of the printer 50 stores various types of programs including multiple pieces of firmware. The RAM of the printer 50 is a storage area for temporarily storing various types of data. For example, it can temporarily store the firmware for an update received from the PC 10. It should be noted that the firmware for an update is erased from the RAM after the installation of the firmware for update in the RAM is completed.

The multiple pieces of firmware stored in the printer 50 can be classified to main firmware and sub-firmware. The main firmware executes the basic operation of the printer 50. The printer 50 usually stores one main firmware. On the other hand, the sub-firmware executes various types of functions (such as communication function, printing function, display function, etc.) of the printer 50. The printer 50 usually stores two or more pieces of sub-firmware (for example, a sub-firmware corresponding to the communication function and a sub-firmware corresponding to the printing function (for example, PCL/PS (Printer Control Language/Post Script))). Note that the printer 60 has the same configuration as that of printer 50.

(Configuration of Web Server 70)

The Web server 70 is provided by the vendor of the printers 50, 60. The Web server 70 stores information pertaining to the multiple pieces of firmware that should be updated (i.e. be refreshed) in the multiple printers including the printers 50, 60 (hereinafter to be referred to as "latest firmware information"). The latest firmware information contains the following contents for each of the multiple pieces of firmware: a firmware name, a type of firmware, the number of the latest version of the firmware (hereinafter to be referred to as "latest version number"), a URL indicating the position in the file server 80 where the latest version of the firmware is stored, and a period needed for the printer to complete update of the firmware (hereinafter to be referred to as the "update period").

(Configuration of File Server 80)

The file server 80 is provided by the vendor of the printers 50, 60. The file server 80 stores firmware for update 82. The firmware for update 82 contains the latest version of each firmware indicated by the latest firmware information stored in the Web server 70.

Each time when the firmware for update 82 is developed by the vendor of the printers 50, 60, the vendor stores the latest firmware information corresponding to the firmware for update in the Web server 70 and stores the firmware for update in the file server 80. In this illustrative embodiment, the Web server 70 and the file server 80 are formed as individual servers separated from each other. However, in a modified example, the Web server 70 and the file server 80 are formed together as a single integrated server.

Figure 2:
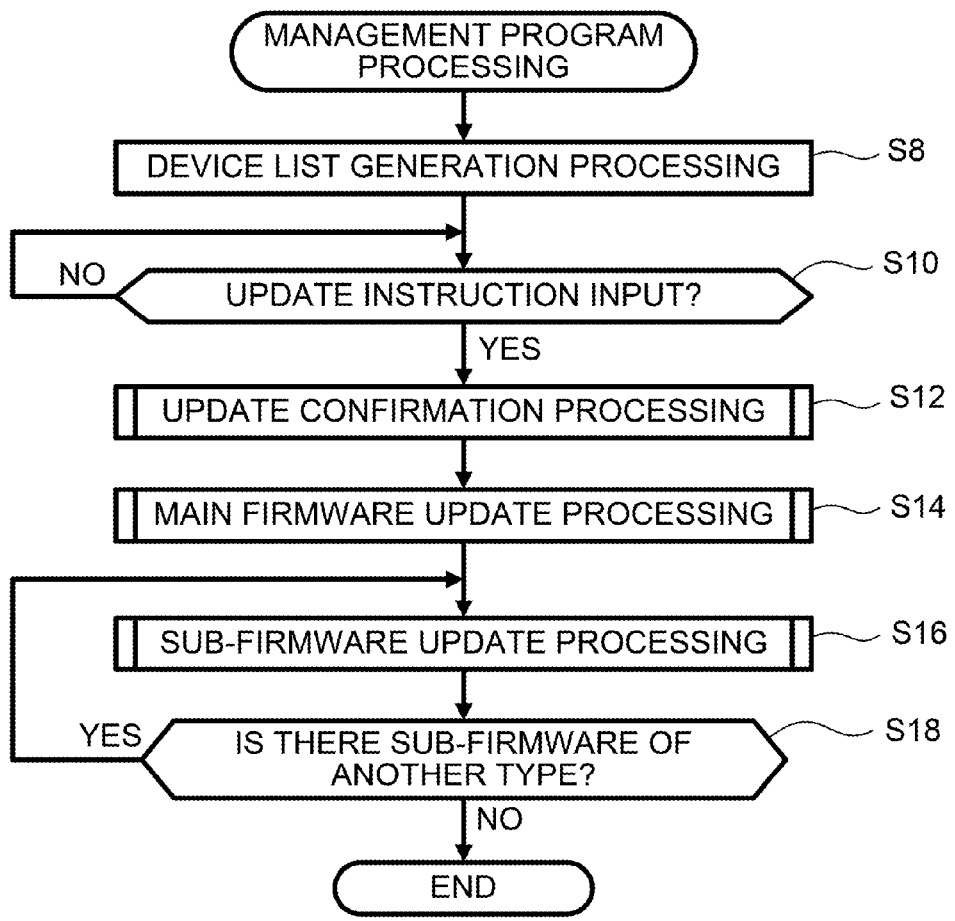
FIG. 2 is a flow chart illustrating management program processing.

(Management Program Processing: FIG. 2)

With reference to FIG. 2, the processing executed by the control unit 20 of the PC 10 according to the management program will be explained. The processing shown in FIG. 2 starts when the user of the PC 10 manipulates the operation unit 14 to start the management program.

In step S8, the control unit 20 executes device list generation processing. Specifically, in step S8, the acquisition unit 38 (see FIG. 1) broadcasts to the LAN 4 a printer information request packet requesting transmission of printer information including a node name and an IP address of a printer. As the printer information request packet is received, each of the printers 50, 60 connected with the LAN 4 generates a response packet including the node name and IP address of the corresponding printer, and sends the response packet to the PC 10. The acquisition unit 38 receives the response packet from each of the printers 50, 60 to acquire the node name and IP address of each of the printers 50, 60.

In step S8, the control unit 20 further generates the device list 32 (see FIG. 1) indicating the node name and IP address of each of the printers 50, 60 in the memory 24, and displays the device list on the display unit 12. As the user looks at the device list 32, the user can find out the node name and IP address of each of the printers 50, 60 connected with the LAN 4.

Next, in step S10, control unit 20 monitors input of an update instruction from the user. The user can manipulate the operation unit 14 in order to select one or more printers (hereinafter to be referred to as "selected printer") that need firmware updated from the device list 32 displayed on the display unit 12. Then, the user can manipulate the operation unit 14 in order to input the update instruction for executing an update of the firmware of the selected printer. In this case, the control unit 20 judges YES in step S10, and the process proceeds to step S12. In the following, the processing of step S12 and thereafter will be explained with reference to an example assuming the printers 50, 60 are the selected printers.

Figure 3:
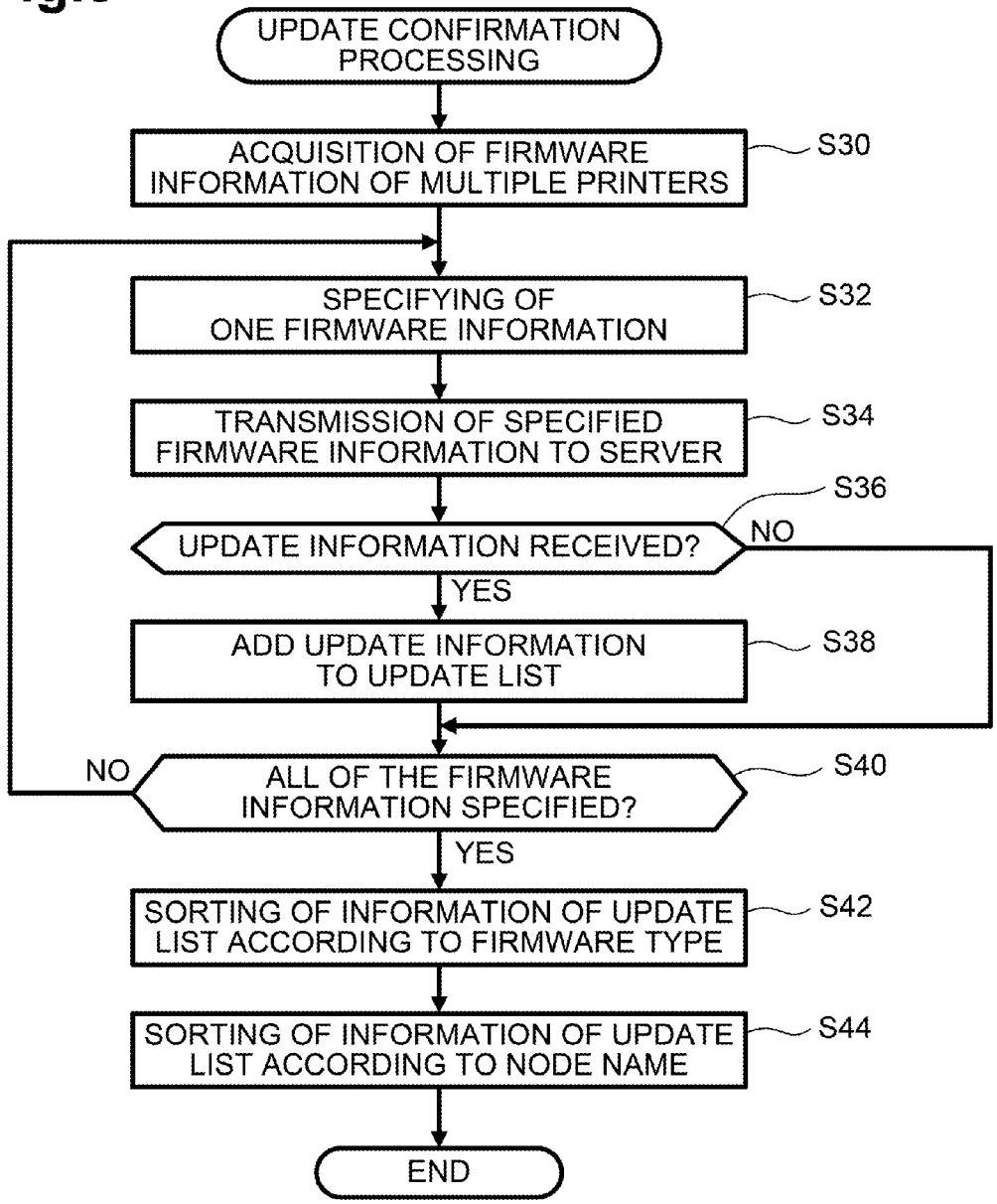
FIG. 3 is a flow chart illustrating update confirmation processing.

(Update Confirmation Processing: FIG. 3)

In step S12, the control unit 20 updates confirmation processing (FIG. 3). As shown in FIG. 3, in the update confirmation processing, the acquisition unit 38 acquires the firmware information of the selected printers 50, 60 in step S30. Specifically, in step S30, the acquisition unit 38 specifies the IP address of one printer 50 among the selected printers 50, 60 from the device list 32. Then, the acquisition unit 38 transmits the firmware information request packet using the IP address of the printer 50 as the destination of transmission. The firmware information request packet requests transmission of the firmware information including the following contents for each of the multiple pieces of firmware stored in the printer 50: a firmware name, a type of firmware, and a current version number of the firmware (hereinafter to be referred to as "current version number").

Upon receiving the firmware information request packet, the printer 50 generates a response packet including multiple pieces of firmware information corresponding to the multiple pieces of firmware stored by the printer 50, and transmits the response packet to the PC 10. The acquisition unit 38 receives the response packet from the printer 50 and thus acquires multiple pieces of firmware information of the printer 50.

In addition, in step S30, the control unit 20 writes the multiple pieces of firmware information of the printer 50 into the update list 34 (see FIG. 4). Specifically, the control unit 20 specifies node name "P50" and IP address "A1" of the printer 50 from the device list 32, and writes them in the update list 34. Then, the control unit 20 writes the firmware name (e.g. "F1"), type (e.g. "MAIN"), and the current version number (e.g. "1.0") contained in the firmware information, for each of the multiple pieces of firmware information of the printer 50. The type of the main firmware is described as "MAIN", the type of the sub-firmware corresponding to the first function (for example, communication function) is described as "1st SUB", and the type of the sub-firmware corresponding to the second function (for example, printing function) is described as "2nd SUB". At this point of time, the latest version number ("New Ver." in FIG. 4), URL, update period, status and IP confirmation flag of the update list 34 are not written.

By executing similar processing for the printer 60, too, the acquisition unit 38 acquires multiple pieces of firmware information of the printer 60, and writes them in the update list 34. The node name and IP address of the printer 60 written in the update list 34 (that is, the node name and IP address of the printer 60 specified from the device list 32) are "P60" and "A2", respectively.

Next, in step S32, the control unit 20 specifies one piece of firmware information from the update list 34. In step S34, the control unit 20 transmits the information packet containing the specified firmware information (that is, firmware name, type, and current version number) to the Web server 70.

Upon receiving the information packet from the PC 10, the Web server 70 specifies the latest firmware information corresponding to the firmware name and type contained in the information packet (hereinafter to be referred to as "specified latest firmware information") using the memory of the Web server 70. Then, the Web server 70 compares the current version number contained in the information packet with the latest version number contained in the specified latest firmware information. If the current version number coincides with the latest version number, the Web server 70 transmits the information indicating "no update" to the PC 10. On the other hand, if the current version number does not coincide with the latest version number (that is, when the current version is not the latest version), the Web server 70 transmits the update information including the specified latest firmware information (that is, the firmware name, type, latest version number, URL, update period) to the PC 10.

In step S36, the control unit 20 judges whether the update information is acquired from the Web server 70. If the information indicating "no update" is received from the Web server 70, the control unit 20 judges NO in step S36, and the process proceeds to step S40 by skipping step S38. In this case, the control unit 20 deletes the one piece of firmware information specified in step S32 from the update list 34. On the other hand, when update information is received from the Web server 70, the control unit 20 judges YES in step S36, and the process proceeds to step S38.

In step S38, the control unit 20 writes, into the update list 34, the latest version number (e.g. "1.1"), URL (e.g. "aaa"), and update period (e.g. "4 (min)") contained in the update information acquired from the Web server 70 (that is, the specified latest firmware information) in association with one piece of firmware information specified in step S32.

Next, in step S40, the control unit 20 judges whether all firmware information in the update list 34 has been specified in step S32. If YES in step S40, the process proceeds to step S42. If NO in step S40, the process returns to step S32, and the control unit 20 specifies another piece of firmware information and executes again the operation of processing in steps S34-S38. For each piece of the firmware information written in the update list 34 at the start of the update confirmation processing shown in FIG. 3, processing of steps of operation S32-S38 is executed, so that the firmware information corresponding to the firmware that does not need update is deleted from the update list 34, and only the firmware information corresponding to the firmware that needs update is retained in the update list 34. In the following, the information of one row contained in the update list 34 will be called "combination information".

In step S42, the transmission order determining unit 48 (see FIG. 1) sorts according to types the multiple pieces of combination information 102-110 in the update list 34. Specifically, the transmission order determining unit 48 executes a sorting operation so that the combination information 102, 104 including type "MAIN" becomes the high-order while the combination information 106-110 including type "SUB" becomes the low-order. In addition, the transmission order determining unit 48 executes the sorting operation so that among the combination information 106-110 including type "SUB", the combination information 106, 108 including "1st SUB" type corresponding to the first function becomes the high-order, and the combination information 110 including type "2nd SUB" corresponding the second function becomes the low-order.

Then, in step S44, the transmission order determining unit 48 executes the sorting operation for the multiple pieces of the combination information 102-110 in the update list 34 for each type according to the node name. In this illustrative embodiment, the transmission order determining unit 48 executes the sorting operation according to the alphabet order of the various node names (that is, the various printer names) (if the alphabet order is the same, according to the rising order of the numeral after the alphabet). That is, the transmission order determining unit 48 executes the sorting operation so that node name "P50" becomes the high-order, while node name "P60" becomes the low-order. Consequently, the transmission order determining unit 48 executes the sorting operation for the two or more combination information 102, 104 including type "MAIN" so that the combination information 102 including node name "P50" becomes the high-order, while the combination information 104 including node name "P60" becomes the low-order. For the combination information 106, 108 including "1st SUB" type, too, the transmission order determining unit 48 executes the sorting operation in a similar way so that the combination information 106 including node name "P50" becomes the high-order, while the combination information 108 including node name "P60" becomes the low-order.

As a result of the processing carried out in steps S42 and S44, the update list 34 is completed with the various combination information 102-110 set in the order shown in FIG. 4. At this point in time, no information is written for the "status" and "IP confirmation flag" in the update list 34. Also, as a modified example, in step S44, the transmission order determining unit 48 may execute the sorting operation according to the order of selection of the printers by the user in step S10 shown in FIG. 2. For example, in step S10 shown in FIG. 2, suppose the user first selects the printer 60 and then selects the printer 50. In this case, in step S44, the transmission order determining unit 48 executes the sorting operation so that the combination information 104 including node name "P60" becomes the high-order, while the combination information 102 including node name "P50" becomes the low-order, and so that the combination information 108 including node name "P60" becomes the high-order, while the combination information 106 including node name "P50" becomes the low-order. After the end of step S44, the update confirmation processing comes to an end.

(Main Firmware Update Processing: FIG. 5)

After the end of the update confirmation processing in step S12 of FIG. 2, the process proceeds to step S14 for main firmware update processing. As shown in FIG. 5, in step S50 of the main firmware update processing, the transmission control unit 43 (see FIG. 1) specifies one piece of combination information including type "MAIN" from the update list 34 (FIG. 4). The transmission control unit 43 specifies one piece of combination information according to the order determined in steps S42, S44 of FIG. 3. That is, in step S50 of the first round, the transmission control unit 43 specifies the combination information 102 with order "1", and, in step S50 of the second round, it specifies the combination information 104 with order "2".

Then, in step S52, according to the URL contained in the combination information specified in step S50 (e.g. URL "aaa" contained in the combination information 102), the acquisition unit 38 executes an inquiry on the file server 80, and downloads the main firmware for update (e.g. the latest version "1.1" of the firmware having firmware name "F1") from the file server 80.

In step S54, the first program transmission unit 44 (see FIG. 1) transmits the main firmware for update downloaded in step S52 by using the IP address (e.g. "A1") contained in the combination information (e.g. 102) specified in step S50 as the transmission destination. As a result, the printer of the transmission destination (e.g. 50) receives the main firmware for update.

Then, upon receiving the main firmware for update, the printer (e.g. 50) transmits to the PC 10 a notification about the end of reception, and temporarily stores the main firmware for update in RAM. The printer then executes install processing for installing the main firmware for update. The install processing adds changes to the existing main firmware in ROM using the main firmware for update in RAM. After the install processing of the main firmware for update, the printer deletes the main firmware for update in RAM. Then, the printer executes a restart operation. As a result, update of the main firmware is completed.

When the IP address of the printer is allotted by a DHCP (Dynamic Host Configuration Protocol) server not shown in the drawing, the printer re-acquires the IP address from the DHCP server upon restarting. An effective period is set to the IP address assigned to the printer by the DHCP server. Consequently, if the printer is restarted after the effective period of the IP address assigned to the printer has passed, the IP address is changed before and after the restart.

In step S56, the transmission control unit 43 monitors the reception of the notification about the end of reception from the printer. When a notification about the end of reception is received, the first program transmission unit 44 judges YES in step S56, and then the process proceeds to step S58.

In step S58, the transmission control unit 43 adds the IP confirmation flag "ON" to the other combination information (e.g. 106) including the same IP address as the IP address (e.g. "A1") contained in the combination information (e.g. 102) specified in step S50 among multiple pieces of the combination information 102-110 without description of "OK" status. That is, an IP confirmation flag "ON" is added when the main firmware has been transmitted to the printer. When the main firmware is not transmitted to the printer, the IP confirmation flag "ON" is not added. The IP confirmation flag "ON" indicates that the IP address of the printer of the transmission destination of the firmware is to be confirmed, when update should be executed for the firmware according to the combination information including the IP confirmation flag "ON". In addition, the transmission control unit 43 adds "OK" status to the combination information (e.g. 102) specified in step S50. "OK" status indicates the end of the transmission of the firmware.

Next, in step S60, from the update list 34, the transmission control unit 43 judges whether all of the combination information including firmware type "MAIN" has been specified. If NO in step S60, the process returns to step S50. In step S50, the transmission control unit 43 specifies another piece of combination information (e.g. 104) and executes the processing of steps S52-S60 according to the order in the update list 34. On the other hand, if YES in step S60, the main firmware update processing comes to an end.

(Sub-Firmware Update Processing: FIG. 6)

As shown in FIG. 2, as the main firmware update processing of step S14 comes to an end, the process proceeds to the sub-firmware update processing in step S16. According to the type of one piece of the sub-firmware, one round of step S16 processing is executed. For example, the processing of step S16 immediately after the end of the update processing of the main firmware of step S14 (that is, the processing of step S16 of the first round) is executed according to the "1st SUB" type of the sub-firmware based on the order in the update list 34. Then, the processing of step S16 of the second round is executed according to the "2nd SUB" type of the sub-firmware. In the following, the type of the sub-firmware of the target of the processing of step S16 will be referred to as "target type".

As shown in FIG. 6, in step 70 of the sub-firmware update processing, the first standby period determining unit 46 (see FIG. 1) determines a standby period which is a period until the start of transmission of the sub-firmware after transmission of the main firmware. Specifically, in step S70, the first standby period determining unit 46 determines, as the standby period, the update period (e.g. "4 (min)") with the longest period among the multiple update periods (e.g. "4 (min)", "2 (min)" contained in the multiple pieces of the combination information 102, 104 including firmware type "MAIN". In step S70, the transmission control unit 43 then starts counting the time with a timer. In this way, the transmission control unit 43 waits for a lapse of the standby period from the time after the end of the main firmware update processing (FIG. 5), that is, from the time after the transmission of the main firmware for update to the printer as the last transmission object in the main firmware update processing (FIG. 5). Consequently, in this illustrative embodiment, the transmission control unit 43 can reliably transmit the firmware to each of the printers 50, 60 at the time after the completion of installation in each of the printers 50, 60.

Then, in step S72, the transmission control unit 43 monitors whether the count value of the timer that starts counting in step S70 has passed the standby period (e.g. "4 (min)") determined in step S70. If the count value of the timer has passed the standby period, the transmission control unit 43 judges YES in step S72, and the process proceeds to step S74.

In step S74, the transmission control unit 43 specifies one piece of combination information including the target type (e.g. "1st SUB") in the update list 34. For example, if the target type is "1st SUB", the transmission control unit 43 specifies the combination information 106 with order "3" in step S74 of the first round, and specifies the combination information 108 with order "4" in step S74 of the second round. However, as explained above, when the IP address of the printer is assigned by the DHCP server not shown in the drawing, the IP address of the printer can be changed at the time of restart for update of the main firmware. Consequently, the processing of the following steps S76, S78, and S80 is executed.

In step S76, the transmission control unit 43 judges whether the IP confirmation flag of the combination information specified in step S74 is "ON". If the IP confirmation flag of the combination information specified in step S74 is "ON" (when YES in step S76), the process proceeds to step S78. On the other hand, if the IP confirmation flag of the combination information specified in step S74 is not "ON" (when NO in step S76), the process proceeds to step S82 by skipping steps S78 and S80. Note that, it is determined to be NO in step S76, for example, when update of the main firmware is not carried out in the printer having the node name contained in the combination information specified in step S74.

In steps S78 and S80, the confirmation unit 39 (see FIG. 1) executes the name resolution processing. Specifically, in step S78, the first packet transmission unit 40a (see FIG. 1) broadcasts, to the LAN 4, an IP address request packet including a node name (e.g. "P50") contained in the combination information (e.g. 106) specified in step S74. The IP address request packet is a packet for requesting a printer of transmission destination of the IP address request packet to transmit a response packet including a current IP address of the printer of the transmission destination, when the node name for identifying the printer of the transmission destination coincides with the node name contained in the IP address request packet. That is, the IP address request packet requests transmission of the response packet from the printer having the node name contained in the IP address request packet. In step S78, the first packet transmission unit 40a receives the response packet.

As explained above, the IP address of the printer can be changed when a restart operation is executed to update the main firmware. Consequently, the IP address contained in the combination information specified in step S74 may be different from the IP address contained in the response packet. The confirmation unit 39 judges whether the two IP addresses coincide with each other in order to confirm a current IP address of the printer of the transmission destination of the sub-firmware. When the two IP addresses are different from each other, in step S80, the confirmation unit 39 updates the IP address contained in the combination information specified in step S74 (e.g. "A2" contained in the combination information 108) to the IP address (e.g. "A3") contained in the response packet. In this case, the confirmation unit 39 also updates the IP address contained in the other combination information including the node name contained in the combination information specified in step S74 (e.g. "A2" contained in the other combination information 110) to the IP address contained in the response packet (e.g. "A3"). When the two IP addresses coincide with each other, the confirmation unit 39 does not carry out update processing of step S80. After step S80, the process proceeds to step S82.

In step S82, according to the URL contained in the combination information specified in step S74 (e.g. URL "ccc" contained in the combination information 106), the acquisition unit 38 makes inquiry on file server 80, and downloads from the file server 80 the sub-firmware for update (e.g. the latest version "2.1" of the firmware having firmware name "F2").

When step S80 is not executed, in step S84, the second program transmission unit 45 (see FIG. 1) uses the IP address contained in the combination information specified in step S74 as the transmission destination, and transmits the sub-firmware for update downloaded in step S82. As explained above, in step S80, the IP address contained in the combination information specified in step S74 may be updated. When step S80 is executed, in step S84, the second program transmission unit 45 uses the updated IP address (that is the IP address after change for the printer of the transmission destination of the sub-firmware for update) as the transmission destination, and transmits the sub-firmware for update.

Similar to the case of the main firmware for update, upon receiving the sub-firmware for update, the printer of the transmission destination transmits to the PC 10 a notification about the end of reception, and executes the install processing. Then, the printer restarts. As a result, update of the sub-firmware for update is completed. At this restart, the IP address of the printer may be changed.

Steps S86 and S88 are similar to steps S56 and S58 shown in FIG. 5. As a result, in step S88, IP confirmation flag "ON" is added to the other combination information (e.g. 110) including the same IP address as the IP address (e.g. "A2") contained in the combination information (e.g. 108) specified in step S74 among the multiple pieces of the combination information without description of "OK" status.

Then, in step S90, from the update list 34, the transmission control unit 43 judges whether all of the combination information (e.g. 106, 108) including the target type (e.g. "1st SUB") has been specified. If all of the combination information including the target type has not been specified, NO in step S90, the process returns to step S74, and the transmission control unit 43 specifies another one piece of combination information (e.g. 108), and executes the processing of steps S76-S88 again. On the other hand, if all of the combination including the target type has been specified, YES in step S90, the sub-firmware update processing comes to an end.

After end of the sub-firmware update processing in step S16 of FIG. 2, in step S18, the control unit 20 judges whether there exists a type (e.g. "2nd SUB") without execution of the sub-firmware update processing. If NO in step S18, the management program processing shown in FIG. 2 comes to an end. On the other hand, when YES in step S18, the process returns to step S16, and the control unit 20 executes the sub-firmware update processing again according to a new target type.

For example, when the second round of sub-firmware update processing is executed, in step S70 of FIG. 6, the first standby period determining unit 46 determines, as the standby period, the update period (e.g. "3 (min)") with the longest period among the multiple update periods (e.g. "3 (min)", "3 (min)") contained in multiple pieces of the combination information 106, 108 including the target type (e.g. "1st SUB") of the first round of firmware update processing. Then the first standby period determining unit 46 starts counting time using the timer. In this way, the transmission control unit 43 waits for lapse of the standby period from the time after end of the first round of sub-firmware update processing, that is, from the time after transmission of the sub-firmware for update to the printer as the last transmission object in the first round of the sub-firmware update processing.

Figure 9A:
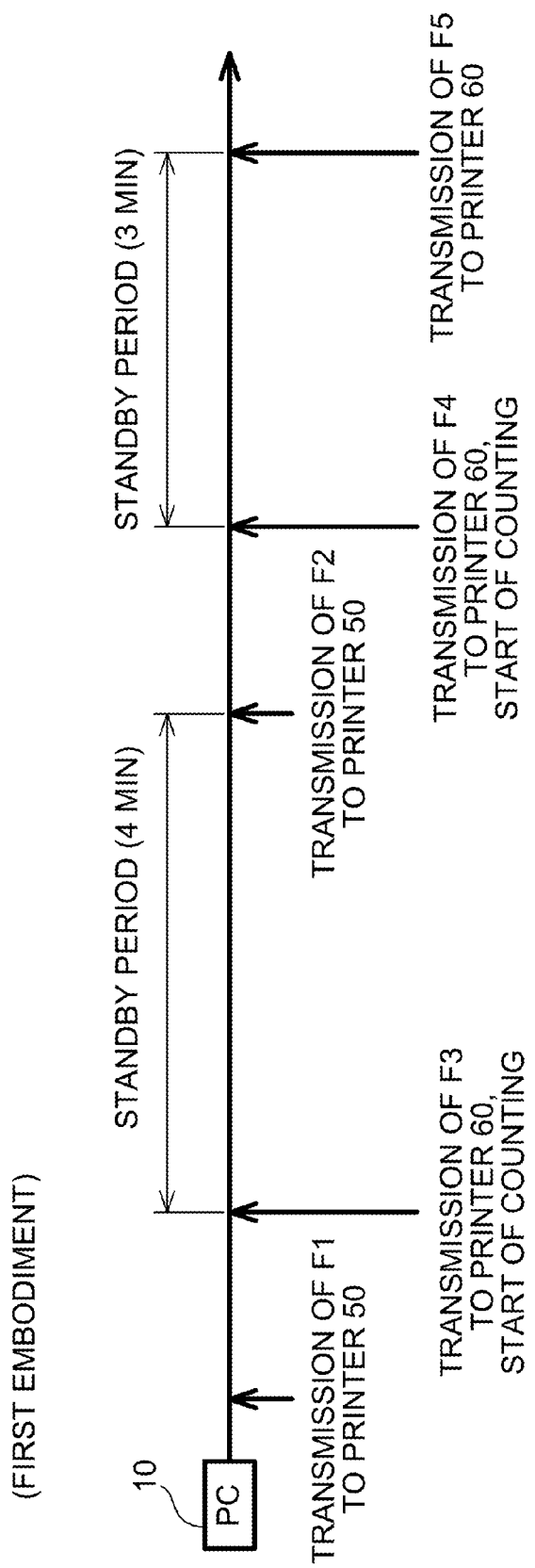

(Processing Executed by the Various Devices in First Illustrative Embodiment: FIGS. 7, 8 and 9A)

As shown in FIG. 7, when the user manipulates the operation unit 14 of the PC 10 to start the management program, the PC 10 broadcasts a printer information request packet to the LAN 4 (see step S8 in FIG. 2). Upon receiving the printer information request packet, the printer 50 generates a response packet including printer information ("P50, A1") so as to transmit it to the PC 10. Similarly, upon receiving the printer information request packet, the printer 60 generates a response packet including printer information ("P60, A2") to transmit to the PC 10. After receiving the response packets from the printers 50, 60, the PC 10 generates the device list 32 (see FIG. 1).

Then, the user manipulates the operation unit 14 to input the update instruction for causing the printers 50, 60 to execute update of the firmware (YES in step S10 of FIG. 2). In this case, the PC 10 transmits a firmware information request packet by using IP address "A1" of the printer 50 as the transmission destination (see step S30 in FIG. 3). Then, the printer 50 transmits a response packet including two pieces of firmware information ("F1, MAIN, 1.0" and "F2, 1st SUB, 2.0") to the PC 10.

Then, the PC 10 transmits a firmware information request packet by using IP address "A2" of the printer 60 as the transmission destination (see step S30 in FIG. 3). Then, the printer 60 transmits a response packet including three pieces of firmware information ("F3, MAIN, 1.4", "F4, 1st SUB, 2.2", and "F5, 2nd SUB, 3.0") to the PC 10. Then, the PC 10 writes the five pieces of firmware information acquired from the printers 50, 60 into the update list 34.

Next, the PC 10 transmits firmware information to the Web server 70, and acquires update information for each of the firmware information from the Web server 70 (see steps S32-S38 in FIG. 3). Then, the PC 10 sorts various combination information 102-110 included in the update list 34 by firmware type, and then sorts by node name (see steps S42, S44 in FIG. 3). By sorting, the order of transmission to the printers 50, 60 of the various pieces of firmware is determined.

Then, the PC 10 makes inquiry on the file server 80, and downloads from the file server 80 the latest version "1.1" of the main firmware for update having firmware name "F1" contained in the combination information 102 with order "1" (see step 52 in FIG. 5). Then, the PC 10 transmits main firmware for update "F1" by using the IP address "A1" of the printer 50 as the transmission destination (see step S54 in FIG. 5).

Upon receiving main firmware for update "F1", the printer 50 executes the install processing of "F1". After the install processing of "F1" by the printer 50, the printer 50 restarts. As a result, in the printer 50, update of "F1" comes to an end. As can be seen from an update period of the combination information 102 shown in FIG. 4, 4 minutes is usually required to carry out update of "F1" (that is, install processing and restart). When restarted, the printer 50 re-acquires an IP address from DHCP server. In the example shown in FIG. 7, the IP address re-acquired by the printer 50 is "A1", and there is no change in the IP address of the printer 50 after restart of the printer 50 from that before restart.

Similarly, the PC 10 makes inquiry on the file server 80, and downloads from the file server 80 the latest version "1.5" of the main firmware for update having firmware name "F3" contained in the combination information 104 with order "2" (see step S52 shown in FIG. 5). Then, the PC 10 transmits main firmware for update "F3" by using the IP address "A2" of the printer 60 as the transmission destination (see step S54 in FIG. 5).

Similar to the case of the aforementioned printer 50, the printer 60 is restarted after the end of the install processing of "F3". Usually, update of "F3" needs 2 minutes (see FIG. 4). When the printer 60 is restarted, it re-acquires the IP address from DHCP server. In the example shown in FIG. 7, the IP address re-acquired by the printer 60 is "A3", and the IP address of the printer 60 is changed after restart of the printer 60 from that before restart. As a result, the main firmware update processing (see FIG. 5) comes to an end.

As shown in FIG. 9A, the PC 10 transmits the main firmware for update "F1" to the printer 50, and it transmits the main firmware for update "F3" to the printer 60. Then, the PC 10 determines, as a standby period, an update period of "4 (min)" with the longest period among update periods of "4 (min)", "2 (min)" contained in the combination information 102, 104 including firmware type "MAIN", and starts counting of the time by the timer (see step S70 of FIG. 6). In this way, according to the present illustrative embodiment, in the main firmware update processing (see FIG. 5), the PC 10 waits for the standby period to lapse after the timing after transmission of the main firmware for update "F3" to the printer 60 as the last transmission object. Then, once the standby period "4 min" has lapsed (YES in step S72 of FIG. 6), the PC 10 starts transmission of sub-firmware for update "F2" to the printer 50 and transmission of sub-firmware for update "F4" to the printer 60.

As explained above, the printer 50 usually requires 4 minutes to update "F1". Then, after lapse of 4 min of the standby period, the PC 10 starts transmission of sub-firmware for update "F2" to the printer 50. Consequently, before reception of "F2", the printer 50 completes update of "F1". Also, the printer 60 usually requires 2 minutes for update of "F3". Accordingly, before reception of "F4", the printer 60 completes update of "F3".

If the printer 50 continuously receives "F1" and "F2" from the PC 10, it is necessary to store both of "F1" and "F2" in the RAM of the printer 50 simultaneously. In this case, if the capacity of the RAM of the printer 50 is insufficient, there is no way to simultaneously store both "F1" and "F2". Also, even assuming both "F1" and "F2" can be simultaneously be stored in the RAM of the printer 50, it is still difficult to execute the install processing of "F1" and "F2" simultaneously. On the other hand, according to this illustrative embodiment, since the printer 50 completes update of "F1" before reception of "F2", there is no need to simultaneously store both "F1" and "F2" in the RAM. Similarly, the printer 60 completes update of "F3" before reception of "F4". That is, for the printers 50, 60, even if the capacity of the memory is small, it is still possible to execute appropriate update of each firmware while making a high efficiency use of the memory.

As shown in FIG. 8, in the first round of sub-firmware update processing (see FIG. 6), the PC 10 broadcasts to LAN 4 an IP address request packet including node name "P50" contained in the combination information 106 with order "3" (see step S78 of FIG. 6). Upon receiving the IP address request packet, the printer 50 having node name "P50" transmits a response packet including a current IP address "A1" of the printer 50 to the PC 10. Note that the printer 60 having node name "P60" does not transmit the response packet when receiving the IP address request packet.

Then, the PC 10 carries out inquiry on the file server 80, and downloads the latest version "2.1" of the sub-firmware for update having firmware name "F2" from the file server 80 (see step S82 of FIG. 6). Then, the PC 10 transmits sub-firmware for update "F2" by using IP address "A1" of the printer 50 as the transmission destination, (step S84 as shown in FIG. 6).

Upon completion of the install processing of sub-firmware for update "F2", the printer 50 restarts. Usually, it takes 3 minutes to update "F2" (see FIG. 4). In the example shown in FIG. 8, the IP address re-acquired by the printer 50 is "A1", and there is no change in the IP address of the printer 50 after restart of the printer 50.

Then, the PC 10 broadcasts to the LAN 4 an IP address request packet including node name "P60" of the printer 60 contained in the combination information 108 with order "4" (step S78 as shown in FIG. 6). As the printer 60 having node name "P60" receives the IP address request packet, it transmits a response packet including a current IP address "A3" of the printer 60. In this case, the PC 10 updates the IP address of the combination information 108, 110 including node name "P60" from "A2" to "A3" (see step S80 of FIG. 6). With this configuration, the PC 10 can appropriately confirm the current IP address (that is, the IP address after change) "A3" of the printer 60.

Then, the PC 10 makes inquiry on the file server 80, and downloads from the file server 80 the latest version "2.3" of the sub-firmware for update having firmware name "F4" (step S82 of FIG. 6). Then, the PC 10 transmits sub-firmware for update "F4" by using IP address "A3" of the printer 60 as the transmission destination (see step S84 of FIG. 6). With this configuration, even if the IP address of the printer 60 is changed after transmission of "F3" and before transmission of "F4", the PC 10 can use IP address "A3" after change as the transmission destination, and the PC 10 can appropriately transmit "F4" to the printer 60.

Upon completion of the install processing of "F4", the printer 60 restarts. It usually takes 3 minutes to update "F4". In the example shown in FIG. 8, the IP address re-acquired by the printer 60 is "A3", and there is no change in the IP address of the printer 60 after restart of the printer 60. As a result, the first round of sub-firmware update processing (FIG. 6) comes to an end.

As shown in FIG. 9A, the PC 10 transmits the sub-firmware for update "F2" to the printer 50, and transmits the sub-firmware for update "F4" to the printer 60. Then, the PC 10 determines, as a standby period, an update period of "3 (min)" with longest period among update periods "3 (min)", "3 (min)" contained in the combination information 106, 108 including "1st SUB" type, and starts counting time using the timer (see step S70 of FIG. 6). In this way, according to the present illustrative embodiment, in the first round of sub-firmware update processing (see FIG. 6), the PC 10 waits for the standby period from the timing after transmission of "F4"

to the printer 60 as the last transmission object. Then, once the standby period "3 (min)" has lapsed (YES in step S72 of FIG. 6), the PC 10 starts transmission processing of the sub-firmware for update "F5" to the printer 60. Consequently, before reception of "F5", the printer 60 completes update of "F4". Consequently, while the memory can be efficiently used, the printer 60 can update various types of firmware.

As shown in FIG. 8, in the second round of firmware update processing (see FIG. 6), the PC 10 broadcasts to the LAN 4 an IP address request packet including node name "P60" of the printer 60 contained in the combination information 110 including type "2nd SUB" (see step S78 of FIG. 6). Then, as mentioned previously, the PC 10 downloads sub-firmware for update "F5" (see step S82 of FIG. 7), and transmits sub-firmware for update "F5" by using IP address "A3" of the printer 60 as the transmission destination. As a result, as mentioned previously, the printer 60 executes update of "F5".

Advantages of First Illustrative Embodiment

As explained above, according to the present illustrative embodiment, as shown in FIG. 7 and FIG. 8, after the PC 10 transmits "F3" by using IP address "A2" of the printer 60 as the transmission destination, the PC 10 confirms the IP address "A3" of the printer 60 after the address has changed by using node name "P60". Consequently, when the IP address of the printer 60 is changed after transmission of "F3" and before transmission of "F4", the PC 10 can appropriately carry out transmission of "F4" by using the current IP address "A3" of the printer 60 as the transmission destination. Consequently, the PC 10 can cause the printer 60 to update the multiple pieces of firmware "F3", "F4" appropriately.

According to the present illustrative embodiment, as shown in FIG. 2, after the end of the main firmware update processing (see FIG. 5), the PC 10 executes sub-firmware update processing (see FIG. 6). That is, the PC 10 can execute transmission of "F3" to the printer 60 between transmission of "F1" to the printer 50 and transmission of "F2" to the printer 50. Consequently, the period between transmissions of "F1" and "F2" to the printer 50 becomes longer. As a result, the printer 50 completes update of "F1" before reception of "F2". Similarly, the PC 10 can execute transmission of "F2" to the printer 50 between transmission of "F3" to the printer 60 and transmission of "F4" to the printer 60. Consequently, the period between transmissions of "F3" and "F4" to the printer 60 becomes longer. As a result, the printer 60 completes update of "F3" before reception of "F4". Accordingly, the printers 50, 60 can delete "F1", "F3" used for update from the RAM for temporarily storing the firmware for update, until reception of "F2" and "F4" from the PC 10, respectively. There is no need for the printer 50 to simultaneously store "F1" and "F2" in its RAM, and there is no need for the printer 60 to simultaneously store "F3" and "F4" in its RAM. In this way, according to the present illustrative embodiment, even if the memory capacity of the printers 50, 60 is insufficient, the printers 50, 60 can make efficient use of the memory and can update the various types of firmware. Accordingly, the PC 10 can cause each of the printers 50, 60 to appropriately execute update of multiple pieces of firmware.

(Corresponding Relationship)

The PC 10 and the printers 50, 60 of the present illustrative embodiment are examples of a "management device", "first device" and "second device" of the present invention, respectively. Firmware "F1" and "F2" are examples of a "first program" and "second program", respectively. Firmware "F3" and "F4" are examples of the "third program" and "fourth program", respectively. The update period "4 (min)" contained in the combination information 102 and the update period "2 (min)" contained in the combination information 104 are examples of "first period information" and "second period information", respectively. In addition, the main firmware update processing in FIG. 5 is an example of "first transmission processing", and the processing of step S74 and thereafter of the sub-firmware update processing in FIG. 6 of the first round is an example of "second transmission processing".

Second Illustrative Embodiment

In the following, explanation will be made with the points of difference from the first illustrative embodiment as the main point. In the second illustrative embodiment, in the device list generation processing of step S8 in FIG. 2, the printer information acquired from the printers 50, 60 by the acquisition unit 38 contains other identification information of the printers 50, 60 in addition to the node name and IP address. In this illustrative embodiment, as an example of the other identification information, the serial number (product number) is used. The serial number is associated with the node name and IP address, and is stored in the device list 32 and the update list 34. In the following, the other identification information will simply be referred to as "identification information".

In the present illustrative embodiment, the contents of the update confirmation processing shown in FIG. 3 are the same as those in the first illustrative embodiment. In addition, in the present illustrative embodiment, the contents of the main firmware update processing shown in FIG. 5 are almost the same as those in the first illustrative embodiment. However, for the second illustrative embodiment, a portion of the contents of processing in step S58 as shown in FIG. 5 is different from the first illustrative embodiment.

In step S58 shown in FIG. 5, the transmission control unit 43 executes processing to add IP confirmation flag "ON". According to the second illustrative embodiment, in step S58 shown in FIG. 5, in addition, a second standby period determining unit 47 (see FIG. 1) determines an update period contained in the combination information specified in step S50 as a standby period for the printer having the node name contained in the specified combination information, and starts counting time using the timer for the printer. Consequently, in step S58 of the first round, the second standby period determining unit 47 (see FIG. 1) determines the update period "4 (min)" contained in the combination information 102 specified in step S50 as the standby period for the printer 50, and starts counting time using the timer for the printer 50. That is, the transmission control unit 43 waits for a lapse of the standby period for the printer 50 from the time after transmission of "F1" to the printer 50. Also, in step S58 of the second round, the second standby period determining unit 47 determines the update period "2 (min)" contained in the combination information 104 specified in step S50 as the standby period for the printer 60, and starts counting time using the timer for the printer 60. That is, the transmission control unit 43 waits for the lapse of the standby period for the printer 60 from the time after transmission of "F3" in the printer 60.

(Sub-Firmware Update Processing: FIG. 10)

According to the second illustrative embodiment, instead of the sub-firmware update processing shown in FIG. 6, a sub-firmware update processing shown in FIG. 10 is executed. As shown in FIG. 10, in step S120, the transmission control unit 43 specifies one piece of combination information including the target type (e.g. "1st SUB"). That is, in the sub-firmware update processing of the first round, the transmission control unit 43 specifies the combination information 106 with order "3" in step S120 of the first round, and specifies the combination information 108 with order "4" in step S120 of the second round.

Then, in step S122, the transmission control unit 43 monitors the count value of the timer for the target printer (e.g. 50) having the node name (e.g. "P50") contained in the combination information (e.g. 106) specified in step S120 to determine if the count value passes the determined standby period (e.g. "4 (min)") for the target printer (e.g. 50). When the standby period has lapsed, the transmission control unit 43 judges YES in step S122, and the process proceeds to step S124. Step S124 is the same as step S76 of FIG. 6.

When the IP confirmation flag is "ON", YES in step S124, the confirmation unit 39 (see FIG. 1) executes the name resolution processing of steps S126-S134. Specifically, in step S126, the second packet transmission unit 40b (see FIG. 1) uses the IP address (e.g. "A1") contained in the combination information (e.g. 106) specified in step S120 as the transmission destination, and transmits an identification information request packet for requesting transmission of the identification information (e.g. serial number). The identification information request packet is a packet for requesting a printer of a transmission destination of the identification information request packet to send a response packet including the identification information.

Next, in step S128, the second packet transmission unit 40b monitors reception of the response packet. When a printer exists that has the IP address (e.g. "A1") contained in the identification information request packet, the printer can receive the identification information request packet and transmit the response packet including the identification information (e.g. serial number) of the printer to the PC 10. In this case, the second packet transmission unit 40b receives the response packet (YES in step S128), and the process proceeds to step S130. On the other hand, when no printer exists that has the IP address contained in the identification information request packet, the response packet is not transmitted to the PC 10. In this case, the second packet transmission unit 40b judges NO in step S128, and the process proceeds to step S132.

In step S130, the judgment unit 42 (see FIG. 1) judges whether the identification information contained in the response packet received in step S128 coincides with the identification information contained in the combination information specified in step S120. If the IP address contained in the combination information specified in step S120 is assigned to a printer having the identification information contained in the combination information, the identification information contained in the response packet coincides with the identification information contained in the combination information (YES in step S130). This means that the IP address of the printer having the identification information contained in the combination information is not changed after the update of the main firmware. When identification information contained in the response packet received in step S128 coincides with the identification information contained in the combination information specified in step S120, YES in step S130, the process proceeds to step S136.

On the other hand, when the IP address contained in the combination information specified in step S120 is assigned to another printer different from the printer having the identification information contained in the combination information, the identification information contained in the response packet does not coincide with the identification information contained in the combination information (NO in step S130). This means that the IP address of the printer having the identification information contained in the combination information is changed after update of the main firmware from the IP address before the update. When it is NO in step S130, the process proceeds to step S132.

In step S132, similar to step S78 of FIG. 6, the third packet transmission unit 40c (see FIG. 1) broadcasts to the LAN 4 an IP address request packet including the node name contained in the combination information specified in step S120, and receives a response packet. Then, in step S134, similar to step S80 shown in FIG. 6, the confirmation unit 39 executes confirmation and update of the IP address. After step S134, the process proceeds to step S136.

The operation in steps S136-S140 is similar to the process in steps S82-S86 of FIG. 6. In step S142, the transmission control unit 43 executes similar processing as in step S88 of FIG. 6 (adding IP confirmation flag "ON" and status "OK"). However, in step S142 of this illustrative embodiment, the second standby period determining unit 47 further determines the update period contained in the combination information specified in step S120 as the standby period for the printer having the node name contained in the combination information, and starts counting time using the timer for the printer. Consequently, in step S142 of the first round, the second standby period determining unit 47 determines the update period "3 (min)" contained in the combination information 106 specified in step S120 as the standby period for the printer 50, and starts counting time using the timer for the printer 50. That is, the transmission control unit 43 waits for a lapse of the standby period for the printer 50 from the time after transmission of "F2" to the printer 50. In addition, in step S142 of the second round, the second standby period determining unit 47 determines the update period "3 (min)" contained in the combination information 108 specified in step S120 as the standby period for the printer 60, and starts counting the timer for the printer 60. That is, the transmission control unit 43 waits for the lapse of the standby period for the printer 60 from the time after transmission of "F4" to the printer 60. Note that, the operation in step S144 is similar to operation in step S90 of FIG. 6.

(Processing Executed by the Various Devices in Second Illustrative Embodiment: FIGS. 9B and 11)

The contents of the various processing until completion of the transmission of main firmware "F1", "F3" are similar to those in FIG. 7. However, according to the second illustrative embodiment, as shown in FIG. 9B, after transmission of "F1" to the printer 50, the PC 10 determines the standby period "4 (min)" for the printer 50, and starts counting (see step S58 of FIG. 5). Then, after the end of transmission of "F3" to the printer 60 and lapse of a standby period "4 (min)" (YES in step S122 of FIG. 10), the PC 10 starts transmission of "F2" to the printer 50. Consequently, the printer 50 completes update of "F1" before reception of "F2". As a result, the printer 50 can update each firmware "F1", "F2" while making efficient use of its memory.

Also, after transmission of "F3" to the printer 60, the PC 10 determines the standby period "2 (min)" for the printer 60, and starts counting (see step S58 of FIG. 5). Then, after transmission of "F2" to the printer 50, and after lapse of the standby period "2 (min)" (YES in step S122 of FIG. 10), the PC 10 starts transmission of "F4" to the printer 60. Consequently, the printer 60 completes update of "F3" before reception of "F4". As a result, the printer 60 can update each firmware "F3", "F4" while making efficient use of its memory.

As shown in FIG. 11, in the sub-firmware update processing of the first round, first of all, the PC 10 uses the IP address "A1" contained in the combination information 106 with order "3" as the transmission destination, and transmits an identification information request packet (see step S126 of FIG. 10). Upon receiving the identification information request packet, the printer 50 transmits a response packet including the identification information to the PC 10. The PC 10 judges that the identification information contained in the response packet coincides with the identification information contained in the combination information 106 (YES in step S128 and YES in step S130 of FIG. 10). With this configuration, when the identification information contained in the response packet coincides with the identification information contained in the combination information 106, that is, when there is no change in the IP address of the printer 50, the PC 10 can appropriately confirm that IP address "A1" is the current IP address of the printer 50.

Then, the PC 10 makes inquiry on the file server 80, and downloads "F2" from the file server 80 (see step S136 of FIG. 10). The PC 10 transmits "F2" by using the IP address "A1" of the printer 50 as the transmission destination (step S138 of FIG. 10).

Then, the PC 10 uses the IP address "A2" contained in the combination information 108 with order "4" as the transmission destination, and transmits an identification information request packet (see step S126 of FIG. 10). In the example shown in FIG. 11, at this point in time, the IP address of the printer 60 has been changed to "A3", and no printer exists that has the IP address of "A2" (that is, a printer having the IP address of "A2" is not connected with LAN 4). Consequently, the PC 10 does not receive the response packet (NO in step S128 of FIG. 10).

In this case, the PC 10 broadcasts an IP address request packet including node name "P60" of the printer 60, and receives a response packet including a current IP address "A3" of the printer 60 (see step S132 of FIG. 10). Then, the PC 10 updates the IP address of the combination information 108, 110 containing node name "P60" from "A2" to "A3" (see step S134 of FIG. 10). With this configuration, when no response packet is received in response to the identification information request packet, that is, when the IP address of the printer 60 is changed, PC 10 can appropriately confirm the current IP address "A3" of the printer 60.

Then, the PC 10 makes inquiry on the file server 80, and downloads "F4" from the file server 80 (see step S136 of FIG. 10). The PC 10 transmits "F4" by using the IP address "A3" of the printer 60 as the transmission destination (see step S138 of FIG. 10).

As shown in FIG. 9B, after transmission of "F4" to the printer 60, the PC 10 determines standby period "3 (min)" for the printer 60, and starts counting (see step S142 of FIG. 10). Then, after lapse of the standby period "3 (min)" (see step S122 of FIG. 10), the PC 10 starts transmission of "F5" to the printer 60. Consequently, the printer 60 completes update of "F4" before reception of "F5". As a result, the printer 60 can update each firmware "F4", "F5" while making efficient use of the memory.

After execution of the installation process of "F4", the printer 60 restarts. In the example shown in FIG. 11, the IP address re-acquired by the printer 60 is "A4", and IP address of the printer 60 is changed after the restart. In addition, in the example shown in FIG. 11, IP address "A3" that had been assigned to the printer 60 is newly assigned to another printer 100.

In the sub-firmware update processing of the second round, the PC 10 uses the IP address "A3" contained in the combination information 110 with order "5" as the transmission destination, and transmits an identification information request packet (see step S126 of FIG. 10). In the example shown in FIG. 11, at this time point, the IP address of the printer 60 is changed to "A4". In addition, IP address "A3" is assigned to another printer 100. Consequently, printer 100 receives the identification information request packet, and transmits a response packet including identification information of the printer 100 to the PC 10. Accordingly, the PC 10 judges that the identification information of the printer 100 contained in the response packet does not coincide with the identification information of the printer 60 contained in the combination information 110 (YES in step S128 and NO in step S130 of FIG. 10).

In this case, the PC 10 broadcasts an IP address request packet including node name "P60" of the printer 60, and receives a response packet including a current IP address "A4" of the printer 60 (see step S132 of FIG. 10). Then, the PC 10 updates the IP address of the combination information 110 including node name "P60" from "A3" to "A4" (see step S134 of FIG. 10). With this configuration, when the identification information contained in the response packet does not coincide with the identification information contained in the combination information 110, that is, when there is a change in the IP address of the printer 60, the PC 10 can appropriately confirm the current IP address "A4" of the printer 60.

Then, the PC 10 carries out inquiry on the file server 80 and downloads "F5" from the file server 80 (see step S136 of FIG. 10). The PC 10 transmits "F5" by using the IP address "A4" of the printer 60 as the transmission destination.

(Corresponding Relationship)

The standby period "4 (min)" after transmission of "F1" and the standby period "2 (min)" after transmission of "F3" shown in FIG. 9B are examples of "first standby period" and "second standby period", respectively.

(Modifications) (Modification 1)

In the above illustrative embodiments, in step S44 of FIG. 3, the transmission order determining unit 48 executes sorting operation by the node name for each type of the firmware. However, the transmission order determining unit 48 may not execute the sorting operation by the node name in S44. In this case, when transmission of "F1" to the printer 50 is executed first and transmission of "F3" to the printer 60 is executed later in the main firmware transmission processing (FIG. 5), transmission of "F4" to the printer 60 may be first executed and transmission of "F2" to the printer 50 may be executed later in the sub-firmware transmission processing of the first round (FIG. 6). Generally, in the first transmission processing, it is not restricted to the order of execution of transmission of the first program and transmission of the third program. In the second transmission processing, it is not restricted to the order of execution of transmission of the second program and transmission of the fourth program. That is, for example, when transmission of the first program to the first device is executed before transmission of the third program to the second device in the first transmission processing, transmission of the fourth program to the second device may be executed before transmission of the third program to the first device in the second transmission processing.

(Modification 2)

In the above illustrative embodiments, firmware "F1"-"F5" that should be updated in the printers 50, 60 are different. However, for example, "F1" is updated in the printer 50, and the same "F1" is updated in the printer 60 instead of "F3". In this case, in order to update "F1" in the printer 50, the acquisition unit 38 downloads "F1" in step S52 of the first round shown in FIG. 5, and the transmission control unit 43 transmits "F1" to the printer 50 in step S54 of the first round shown in FIG. 5. Then, in order to update "F1" in the printer 60, the acquisition unit 38 may not re-downloaded "F1" in step S52 of the second round shown in FIG. 5, the transmission control unit 43 may transmit the already downloaded "F1" to the printer 60. That is, if the first program and the third program are the same, the acquisition unit 38 may execute acquisition only once for acquiring the same program (i.e. the first program and the third program).

(Modification 3)

In the first illustrative embodiment, the transmission control unit 43 transmits "F3" to the printer 60, and starts counting when a notification about the end of reception is received from the printer 60 (see step S70 of FIG. 6). However, instead of this, the transmission control unit 43 may start counting without waiting for reception of the notification about the end of reception, or may start counting after lapse of a prescribed period from the time point of reception of the notification about the end of reception. Generally, the transmission control unit may wait for the lapse of the standby period from the time after transmission of the third program to the second device as the last transmission object.

Similarly, in step S142 of FIG. 10 of the second illustrative embodiment, the transmission control unit 43 may start counting without waiting for reception of the notification about the end of reception, or may start counting after lapse of a prescribed period from the time point of reception of the notification about the end of reception. Generally, the transmission control unit may wait for the lapse of the first standby period from the timing after transmission of the first program to the first device, and may wait for the lapse of the second standby period from the timing after transmission of the third program to the second device.

(Modification 4)

In the first illustrative embodiment, the first standby period determining unit 46 determines, as the standby period, the update period with the longest period among the multiple update periods contained in the multiple combination information including the firmware type "MAIN". However, instead of this, the first standby period determining unit 46 may determine, as the standby period, the period obtained by adding or subtracting a prescribed period to the update period with the longest period. In addition, the first standby period determining unit 46 may determine, as the standby period, the mean value of multiple update periods. Generally, the first standby period determining unit 46 may determine the standby period based on the first period information and the second period information.

Similarly, the second standby period determining unit 47 may determine, as the standby period, the period obtained by adding or subtracting a prescribed period to the update period. Generally, the second standby period determining unit may determine the first standby period based on the first period information, and determine the second standby period based on the second period information.

(Modification 5)

In the above illustrative embodiments, the printers 50, 60 execute update of the firmware by executing install processing of the firmware and restarting, each time when one firmware is received. That is, in the above illustrative embodiments, a sum of a period needed for the install processing and a period needed for restart is an example of the "first (or second) period information pertaining to a period needed for the first (or second) device to complete update of the first (or second) program". However, instead of this, each time when one firmware is received, the printers 50, 60 may execute the install processing of the firmware, but may not execute restart. In this case, the printers 50, 60 may execute restart after end of the install processing of all pieces of the firmware. In this modification, the period needed for the install processing (that is, without considering the period needed for restart) is an example of the "first (or second) period information pertaining to a period needed for the first (or second) device to complete update of the first (or second) program".

(Modification 6)

In the above illustrative embodiments, the acquisition unit 38 downloads each firmware ("F1", "F2", etc.) from the file server 80 before transmission of it to the printer 50, 60. However, instead of this, after acquisition of the firmware information from the printers 50, 60, the acquisition unit 38 may download the multiple pieces of firmware ("F1", "F2", etc.) collectively from the file server 80. Generally, the acquisition unit may acquire m (wherein m is an integer of 2 or more) programs that are to be updated in the first device and n (wherein n is an integer of 2 or more) programs that are to be updated in the second device from the server.

(Modification 7)

The "management device" is not limited to the PC 10. It may also be other devices such as a mobile telephone, PDA, server, etc. In addition, "devices" are not limited to the printers 50, 60. There may also be other devices that need update of firmware, such as mobile telephones, PDAs, FAX machines, copiers, scanners, multifunctional devices, etc.

(Modification 8)

In the above illustrative embodiments, the various units 38-48 are realized by the CPU 22 executing processing according to the software. However, instead of this, at least a portion of the various units 38-48 may be realized by hardware such as a logic circuit.

While the invention has been described in connection with various example structures and illustrative embodiments, it will be understood by those skilled in the art that other variations and modifications of the structures, configurations, and embodiments described above may be made without departing from the scope of the invention. For example, this application comprises any possible combination of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A management device comprising:
a processor;
a memory having computer-readable instructions stored thereon that, when executed by the processor, cause the management device to perform steps comprising:
acquiring "m" programs that are to be updated in a first device and "n" programs that are to be updated in a second device, from a server via a network, wherein "m" is an integer greater than or equal to 2, "n" is an integer greater than or equal to 2, the "m" programs include a first program and a second program, and the "n" programs include a third program and a fourth program, wherein the acquiring step further includes acquiring first period information and second period information from the server, wherein the first period information relates to a period for the first device to complete an update of the first program, and the second period information relates to a period for the second device to complete an update of the third program;

determining an order for transmitting the m and n programs to be updated based on information about the m and n programs to be updated;

determining a standby period based on the first period information and the second period information;

transmitting the first program to the first device and transmitting the third program to the second device according to the determined order;

waiting for the standby period to lapse from a time after transmission of a last one of the first program and the third program to be transmitted according to the determined order; and transmitting the second program to the first device and transmitting the fourth program to the second device according to the determined order, after the standby period has lapsed.

2. The management device according to claim 1, wherein the step of determining the standby period includes determining the standby period based on period information that indicates a longest period among period information including the first period information and the second period information.

3. A management device comprising:

a processor;

a memory having computer-readable instructions stored thereon that, when executed by the processor, cause the management device to perform steps comprising:

acquiring "m" programs that are to be updated in a first device and "n" programs that are to be updated in a second device, from a server via a network, wherein "m" is an integer greater than or equal to 2, "n" is an integer greater than or equal to 2, the "m" programs include a first program and a second program, and the "n" programs include a third program and a fourth program, wherein the acquiring step further includes acquiring first period information and second period information from the server, wherein the first period information relates to a period for the first device to complete an update of the first program, and the second period information relates to a period for the second device to complete an update of the third program;

determining an order for transmitting the m and n programs to be updated based on information about the m and n programs to be updated;

transmitting the first program to the first device and transmitting the third program to the second device according to the determined order;

determining a first standby period for the first device based on the first period information and a second standby period for the second device based on the second period information;

waiting for the first standby period to lapse from a time after transmission of the first program to the first device;

waiting for the second standby period to lapse from a time after transmission of the third program to the second device; and transmitting the second program to the first device and transmitting the fourth program to the second device according to the determined order, after completion of transmitting the first program to the first device and the third program to the second device, the step of transmitting further including:

starting transmission of the second program to the first device after the first standby period has lapsed; and starting transmission of the fourth program to the second device after the second standby period has lapsed.

4. The management device according to claim 1, wherein the computer-readable instructions, when executed by the processor, further cause the management device to perform steps comprising:

when the order for transmitting is determined so that transmission of a program to the first device is executed before transmission of a program to the second device, starting transmission of the third program to the second device after transmission of the first program to the first device, and starting transmission of the fourth program to the second device after transmission of the second program to the first device.

5. The management device according to claim 3, wherein the computer-readable instructions, when executed by the processor, further cause the management device to perform steps comprising:

when the order for transmitting is determined so that transmission of a program to the first device is executed before transmission of a program to the second device, starting transmission of the third program to the second device after transmission of the first program to the first device, and starting transmission of the fourth program to the second device after transmission of the second program to the first device.

6. A non-transitory, computer-readable storage medium storing computer-readable instructions that, when executed by a processor, cause performance of steps comprising:

acquiring "m" programs that are to be updated in a first device and "n" programs that are to be updated in a second device, from a server via a network, wherein "m" is an integer greater than or equal to 2, "n" is an integer greater than or equal to 2, the "m" programs include a first program and a second program, and the "n" programs include a third program and a fourth program, wherein the acquiring step further includes acquiring first period information and second period information from the server, wherein the first period information relates to a period for the first device to complete an update of the first program, and the second period information relates to a period for the second device to complete an update of the third program;

determining an order for transmitting the m and n programs to be updated based on information about the m and n programs to be updated;

determining a standby period based on the first period information and the second period information;

transmitting the first program to the first device and transmitting the third program to the second device according to the determined order;

waiting for the standby period to lapse from a time after transmission of a last one of the first program and the third program to be transmitted according to the determined order; and transmitting the second program to the first device and transmitting the fourth program to the second device, after the standby period has lapsed.

7. The computer-readable storage medium according to claim 6, wherein the step of determining the standby period includes determining the standby period based on period information that indicates a longest period among period information including the first period information and the second period information.

8. A non-transitory computer-readable storage medium storing computer-readable instructions that, when executed by a processor, cause performance of steps comprising:

acquiring "m" programs that are to be updated in a first device and "n" programs that are to be updated in a second device, from a server via a network, wherein "m" is an integer greater than or equal to 2, "n" is an integer greater than or equal to 2, the "m" programs include a first program and a second program, and the "n" programs include a third program and a fourth program, wherein the acquiring step further includes acquiring first period information and second period information from the server, wherein the first period information relates to a period for the first device to complete an update of the first program, and the second period information relates to a period for the second device to complete an update of the third program, and determining an order for transmitting the m and n programs to be updated based on information about the m and n programs to be updated;

transmitting the first program to the first device and transmitting the third program to the second device according to the determined order;

determining a first standby period for the first device based on the first period information and a second standby period for the second device based on the second period information;

waiting for the first standby period to lapse from a time after transmission of the first program to the first device;

waiting for the second standby period to lapse from a time after transmission of the third program to the second device; and transmitting the second program to the first device and transmitting the fourth program to the second device, after completion of transmitting the first program to the first device and the third program to the second device according to the determined order, the step of transmitting further including:

starting transmission of the second program to the first device after the first standby period has lapsed; and starting transmission of the fourth program to the second device after the second standby period has lapsed.

9. The computer-readable storage medium according to claim 6, wherein the computer-readable instructions, when executed by the processor, further cause performance of steps comprising:

when the order for transmitting is determined so that transmission of a program to the first device is executed before transmission of a program to the second device, starting transmission of the third program to the second device after transmission of the first program to the first device, and starting transmission of the fourth program to the second device after transmission of the second program to the first device.

10. The computer-readable storage medium according to claim 8, wherein the computer-readable instructions, when executed by the processor, further cause performance of steps comprising:

when the order for transmitting is determined so that transmission of a program to the first device is executed before transmission of a program to the second device, starting transmission of the third program to the second device after transmission of the first program to the first device, and starting transmission of the fourth program to the second device after transmission of the second program to the first device.

11. A management device comprising:

a processor;

a memory having computer-readable instructions stored thereon that, when executed by the processor, cause the management device to perform steps comprising:

acquiring "m" programs that are to be updated in a first device and "n" programs that are to be updated in a second device, from a server via a network, wherein "m" is an integer greater than or equal to 2, "n" is an integer greater than or equal to 2, the "m" programs include a first program and a second program, and the "n" programs include a third program and a fourth program;

acquiring first period information and second period information from the server, wherein the first period information relates to a period for the first device to complete an update of the first program, and the second period information relates to a period for the second device to complete an update of the third program, determining a first standby period for the first device based on the first period information and a second standby period for the second device based on the second period information;

transmitting the first program to the first device and transmitting the third program to the second device, transmitting the second program to the first device and transmitting the fourth program to the second device, after transmitting the first program to the first device and the third program to the second device, waiting for the first standby period to lapse from a time after transmission of the first program to the first device;

starting transmission of the second program to the first device after the first standby period has lapsed;

waiting for the second standby period to lapse from a time after transmission of the third program to the second device; and starting transmission of the fourth program to the second device after the second standby period has lapsed.

* * * * *